United States Patent
Gong et al.

(10) Patent No.: US 11,913,130 B1
(45) Date of Patent: Feb. 27, 2024

(54) ELECTRODEPOSITION OF HIGH DAMPING MAGNETIC ALLOYS

(71) Applicant: Seagate Technology LLC, Fremont, CA (US)

(72) Inventors: Jie Gong, Eden Prairie, MN (US); Steven C. Riemer, Minneapolis, MN (US); John A. Rice, Long Lake, MN (US); Hilton Erskine, Hillman, MN (US); Michael C. Kautzky, Eagan, MN (US); Xuelian Xu, Eden Prairie, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/830,695

(22) Filed: Jun. 2, 2022

Related U.S. Application Data

(60) Division of application No. 16/705,991, filed on Dec. 6, 2019, now Pat. No. 11,377,749, which is a
(Continued)

(51) Int. Cl.
*G11B 5/187* (2006.01)
*C25D 3/56* (2006.01)
*C25D 5/18* (2006.01)

(52) U.S. Cl.
CPC ............... *C25D 3/562* (2013.01); *C25D 5/18* (2013.01); *G11B 5/187* (2013.01)

(58) Field of Classification Search
None
See application file for complete search history.

(56) References Cited

U.S. PATENT DOCUMENTS 5,051,856 A * 9/1991 Narishige .............. B82Y 25/00
360/125.33
6,038,106 A   3/2000 Aboaf et al.
(Continued)

FOREIGN PATENT DOCUMENTS

CN      110331372 A  * 10/2019
EP       0742549 A2     11/1996
(Continued)

OTHER PUBLICATIONS

U.S. Patent Office issued prosecution for U.S. Appl. No. 17/478,461, filed Sep. 17, 2021, including: Office Action dated Apr. 18, 2023, 19 pages; Applicant Initiated Interview Summary dated Mar. 22, 2023, 2 pages; Requirement for Restriction-Election dated Feb. 9, 2023, 6 pages; 27 pages total.
(Continued)

*Primary Examiner* — William J Klimowicz
(74) *Attorney, Agent, or Firm* — Westman, Champlin & Koehler, P.A.

(57) ABSTRACT

A data storage device comprising a recording head having a high damping magnetic alloy layer including at least one magnetic alloy element, and a 5d transition element; the high damping magnetic alloy layer having a mixed face-centered cubic (fcc) and body-centered cubic (bcc) crystal structure, and the mixed fcc and bcc crystal structure comprising fcc and bcc grains, with the bcc grains having an elongated shape relative to the fcc grains, a larger size than the fcc grains, and slip deformation, thereby providing the high damping magnetic alloy layer with a damping constant of up to about 0.07.

15 Claims, 20 Drawing Sheets

Related U.S. Application Data continuation-in-part of application No. 15/785,698, filed on Oct. 17, 2017, now abandoned.

(56) References Cited

U.S. PATENT DOCUMENTS

| | | | |
|---|---|---|---|
| 6,120,918 A * | 9/2000 | Osaka | H01F 10/16 |
| | | | 428/812 |
| 6,132,892 A * | 10/2000 | Yoshikawa | G11B 5/3109 |
| | | | 428/812 |
| 6,778,357 B2 | 8/2004 | Tabakovic et al. | |
| 6,837,979 B2 | 1/2005 | Uzoh et al. | |
| 7,113,367 B2 | 9/2006 | Yazawa et al. | |
| 7,135,103 B2 | 11/2006 | Osaka et al. | |
| 7,192,662 B2 | 3/2007 | Chen et al. | |
| 7,569,131 B2 | 8/2009 | Hixon-Goldsmith et al. | |
| 7,595,959 B2 | 9/2009 | Covington et al. | |
| 8,000,063 B2 | 8/2011 | Yamaguchi et al. | |
| 8,118,990 B2 | 2/2012 | Liu et al. | |
| 8,917,484 B2 | 12/2014 | Gong et al. | |
| 9,005,420 B2 | 4/2015 | Tomantschger et al. | |
| 9,142,226 B2 | 9/2015 | Inturi et al. | |
| 9,359,683 B2 | 6/2016 | Kim et al. | |
| 9,466,319 B1 | 10/2016 | Tang et al. | |
| 9,508,364 B1 * | 11/2016 | Tang | G11B 5/313 |
| 9,598,785 B2 | 3/2017 | Patolsky et al. | |
| 9,601,484 B2 | 3/2017 | Herget et al. | |
| 9,626,990 B2 | 4/2017 | Tang et al. | |
| 11,152,020 B1 * | 10/2021 | Gong | C25D 5/18 |
| 11,302,350 B1 * | 4/2022 | Zhang | G11B 5/11 |
| 11,377,749 B1 * | 7/2022 | Gong | H01F 41/26 |
| 11,798,583 B1 | 10/2023 | Gong et al. | |
| 2002/0154443 A1 | 10/2002 | Kawasaki et al. | |
| 2003/0044303 A1 | 3/2003 | Chen et al. | |
| 2003/0048582 A1 | 3/2003 | Kanada et al. | |
| 2003/0058576 A1 * | 3/2003 | Honjo | G11B 5/3133 |
| | | | 360/123.25 |
| 2003/0234181 A1 | 12/2003 | Palumbo et al. | |
| 2004/0051999 A1 | 3/2004 | Yazawa et al. | |
| 2004/0078970 A1 | 4/2004 | Naitoh et al. | |
| 2005/0121317 A1 | 6/2005 | Klocke et al. | |
| 2005/0211563 A1 * | 9/2005 | Ivey | C25D 5/18 |
| | | | 205/255 |
| 2007/0058294 A1 | 3/2007 | Gotoh | |
| 2007/0097547 A1 | 5/2007 | Yazawa et al. | |
| 2007/0165330 A1 * | 7/2007 | Yamaguchi | G11B 5/3163 |
| 2007/0242391 A1 | 10/2007 | Yamaguchi et al. | |
| 2008/0088983 A1 | 4/2008 | Meyer et al. | |
| 2008/0166584 A1 | 7/2008 | Deligianni et al. | |
| 2010/0079895 A1 | 4/2010 | Takayama et al. | |
| 2012/0280773 A1 | 11/2012 | Singleton et al. | |
| 2013/0022840 A1 | 1/2013 | Hsiao et al. | |
| 2013/0027809 A1 | 1/2013 | Min et al. | |
| 2013/0334051 A1 | 12/2013 | Chen et al. | |
| 2014/0004387 A1 | 1/2014 | Inturi et al. | |
| 2014/0120374 A1 | 5/2014 | Zhu et al. | |
| 2014/0209476 A1 | 7/2014 | Zhou et al. | |
| 2019/0112722 A1 * | 4/2019 | Gong | C25D 7/001 |

FOREIGN PATENT DOCUMENTS

| | | |
|---|---|---|
| EP | 2680264 A1 | 1/2014 |
| GB | 1 569 250 A | 6/1980 |
| GB | 2392922 A | 3/2004 |
| JP | H05-345997 A | 12/1993 |
| JP | H0923031 A | 1/1997 |
| JP | H09-63016 A | 3/1997 |
| JP | H11154609 A | 6/1999 |
| JP | 2002056507 A | 2/2002 |

OTHER PUBLICATIONS

Jankowski et al., "The thermal stability of nanocrystalline Au—Cu alloys," ScienceDirect, Thin Solid Films 515, pp. 1152-1156; Sep. 7, 2006 (Year: 2006).

Lou, Helen H. et al., "Electroplating", Encyclopedia of Chemical Processing, DOI: 10.1081/E-ECHP-120007747, Copyright © 2006 by Taylor & Francis, All Rights Reserved, 10 pages.

Vossen, John L. et al., "Thin Film Processes", Scientific Library, Dec. 10, 1979, Pat. & T.M. Office, Academic Press (AP), New York, San Francisco, London, 1978, A Subsidiary of Harcourt Brace Jovanovich, Publishers, 5 pages.

U.S. Patent Office issued prosecution for U.S. Appl. No. 15/785,698, filed Oct. 17, 2017, including: Final Office Action dated Aug. 8, 2019, 15 pages; Applicant Initiated Interview Summary dated May 30, 2019, 3 pages; Non-Final Rejection dated Feb. 26, 2019, 14 pages; Applicant Initiated Interview Summary dated Dec. 13, 2018, 3 pages; Requirement for Restriction-Election dated Oct. 25, 2018, 6 pages; 41 pages total.

U.S. Patent Office issued prosecution for U.S. Appl. No. 16/411,629, filed May 14, 2019, including: Notice of Allowance and Fees Due (PTOL-85) and Examiner Initiated Interview Summary dated Jul. 30, 2021, 10 pages; Applicant Initiated Interview Summary dated May 26, 2021, 2 pages; Non-Final Rejection dated Mar. 16, 2021, 9 pages; Requirement for Restriction-Election dated Nov. 10, 2020, 6 pages; 27 pages total.

U.S. Patent Office issued prosecution for U.S. Appl. No. 16/705,991, filed Dec. 6, 2019, including: Notice of Allowance dated Feb. 14, 2022, 7 pages; Applicant Initiated Interview Summary dated Dec. 14, 2021, 2 pages; Non-Final Rejection dated Oct. 7, 2021, 15 pages; Advisory Action dated Jul. 29, 2021, 2 pages; Applicant Initiated Interview Summary dated Jun. 30, 2021, 2 pages; Final Rejection dated May 28, 2021, 14 pages; Applicant Initiated Interview Summary dated Apr. 14, 2021, 2 pages; Non-Final Rejection dated Feb. 12, 2021, 14 pages; Requirement for Restriction-Election dated Dec. 31, 2020, 5 pages; 63 pages total.

Notice of Allowance and Fee(s) Due for U.S. Appl. No. 17/478,461, dated Aug. 23, 2023, 9 pages.

Supplemental Notice of Allowability for U.S. Appl. No. 17/478,461, dated Sep. 15, 2023, 4 pages.

* cited by examiner

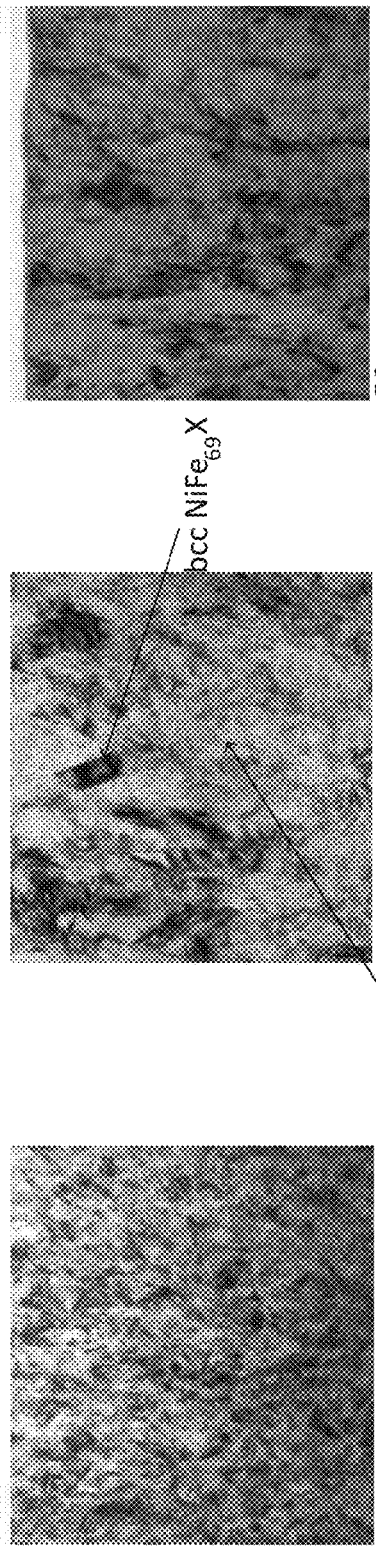
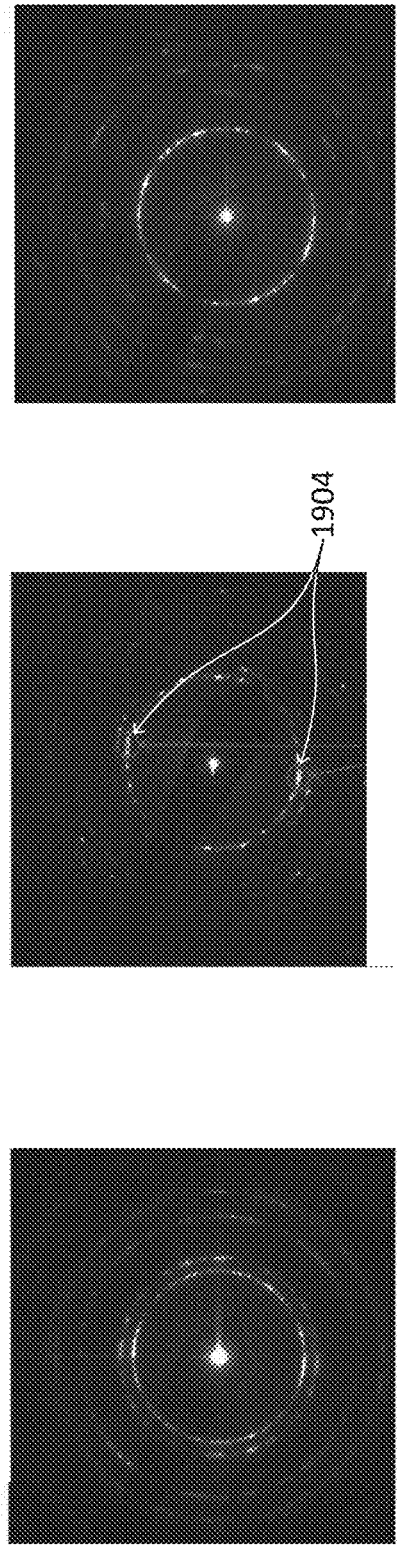

ELECTRODEPOSITION OF HIGH DAMPING MAGNETIC ALLOYS

The present application is a divisional of U.S. application Ser. No. 16/705,991, filed on Dec. 6, 2019, now U.S. Pat. No. 11,377,749; which is a continuation-in-part application of U.S. application Ser. No. 15/785,698, filed Oct. 17, 2017, and entitled "ELECTRODEPOSITION OF HIGH DAMPING MAGNETIC ALLOYS," now abandoned, the contents of which are hereby incorporated by reference in their entireties.

BACKGROUND

Data storage devices use magnetic recording heads to read and/or write data on magnetic storage media, such as data storage discs. Magnetic recording heads typically include inductive write elements to record data on the storage media. An inductive write element or transducer may include a main pole having a pole tip and one or more return poles. Current is supplied to write coils to induce a flux path in the main pole to record data on one or more magnetic storage layers of the media.

With ever-increasing levels of recording density in disc drives, the write element needs to have correspondingly better data-recording capabilities and needs to be substantially reliable. In general, as areal recording densities for storage discs increase, technological advances and changes to various components of the disc drives are needed.

SUMMARY

Various embodiments of the disclosure generally relate to including high damping materials with low impurity levels in elements (for example, shields and/or poles) of recording heads to improve reliability of the recording heads. In different embodiments, electrodeposition or electroplating may be used to form the elements with the high damping materials.

In one embodiment, a method is provided. The method includes immersing a wafer in an electrolyte including a plurality of compounds having elements of a high damping magnetic alloy. The method also includes applying a pulsed current to the wafer when the wafer is immersed in an electrolyte. The wafer is removed from the electrolyte when a layer of the high damping magnetic alloy is formed on the wafer.

Other features and benefits that characterize embodiments of the disclosure will be apparent upon reading the following detailed description and review of the associated drawings.

BRIEF DESCRIPTION OF THE DRAWINGS

FIGS. 19D, 19E and 19F are images of NiFeX layers generated from transmission electron microscopy (TEM).

FIGS. 19G, 19H and 19I show selected area electron diffraction (SAED) images of NiFeX layers.

DETAILED DESCRIPTION OF ILLUSTRATIVE EMBODIMENTS

Embodiments of the disclosure generally relate to including high damping materials in elements (for example, shields and/or poles) of recording heads to improve reliability of the recording heads. In different embodiments, electrodeposition or electroplating may be used to form the elements with the high damping materials. However, prior to providing additional details regarding the different embodiments, a description of an illustrative operating environment is provided below.

Figure 1A:
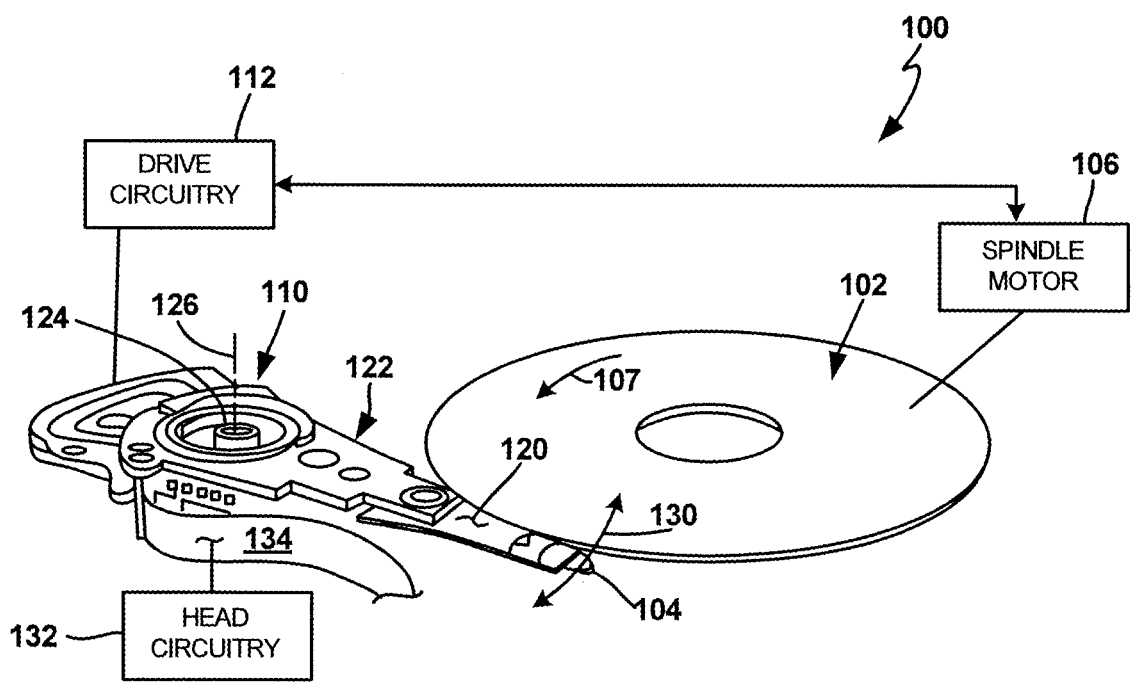
FIG. 1A illustrates an embodiment of a data storage device in which embodiments of the present application can be used.

FIG. 1A shows an illustrative operating environment in which certain write head embodiments formed by methods disclosed herein may be incorporated. The operating environment shown in FIG. 1A is for illustration purposes only. Embodiments of the present disclosure are not limited to any particular operating environment such as the operating environment shown in FIG. 1A. Embodiments of the present disclosure are illustratively practiced within any number of different types of operating environments.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third"

elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

FIG. 1A is a schematic illustration of a data storage device 100 including a data storage medium and a head for reading data from and/or writing data to the data storage medium. As shown in FIG. 1A, the data storage device 100 includes a data storage medium 102 and a head 104. The head 104 including one or more transducer elements (not shown in FIG. 1A) is positioned above the data storage medium 102 to read data from and/or write data to the data storage medium 102. In the embodiment shown, the data storage medium 102 is a rotatable disc or other magnetic storage medium that includes a magnetic storage layer or layers. For read and write operations, a spindle motor 106 (illustrated schematically) rotates the medium 102 as illustrated by arrow 107 and an actuator mechanism 110 positions the head 104 relative to data tracks on the rotating medium 102. Both the spindle motor 106 and actuator mechanism 110 are connected to and operated through drive circuitry 112 (schematically shown). The head 104 is coupled to the actuator mechanism 110 through a suspension assembly which includes a load beam 120 connected to an actuator arm 122 of the mechanism 110 for example through a swage connection.

The one or more transducer elements of the head 104 are coupled to head circuitry 132 through flex circuit 134 to encode and/or decode data. Although FIG. 1A illustrates a single load beam 120 coupled to the actuator mechanism 110, additional load beams 120 and heads 104 can be coupled to the actuator mechanism 110 to read data from or write data to multiple discs of a disc stack. The actuator mechanism 110 is rotationally coupled to a frame or deck (not shown) through a bearing 124 to rotate about axis 126. Rotation of the actuator mechanism 110 moves the head 104 in a cross track direction as illustrated by arrow 130.

Figure 1B:
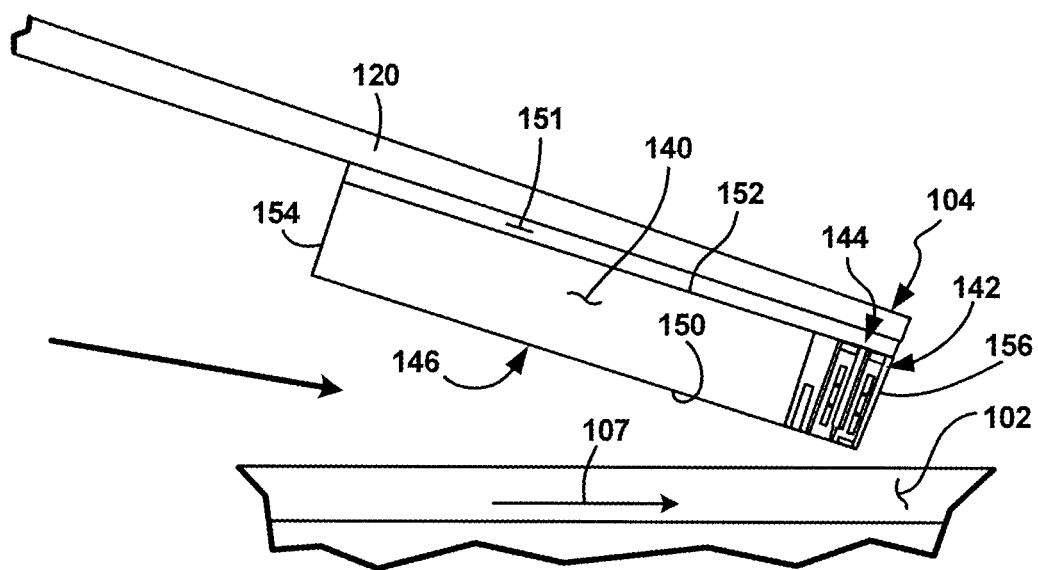
FIG. 1B is a schematic illustration of a head including one or more transducer elements above a magnetic recording medium.

FIG. 1B is a detailed illustration (side view) of the head 104 above the medium 102. The one or more transducer elements on the head 104 are fabricated on a slider 140 to form a transducer portion 142 of the head 104. The transducer portion 142 shown includes write elements encapsulated in an insulating structure to form a write assembly 144 of the head. As shown, the head 104 includes a bearing surface (for example, and air bearing surface (ABS)) 146 along a bottom surface 150 of the head or slider facing the medium 102. The head 104 is coupled to the load beam 120 through a gimbal spring 151 coupled to a top surface 152 of the head or slider 140 facing away from the medium 102. The medium 102 can be a continuous storage medium, a discrete track medium, a bit patterned medium or other magnetic storage medium including one or more magnetic recording layers.

During operation, rotation of the medium or disc 102 creates an air flow in direction 107 as shown in FIG. 1B along the air bearing surface 146 of the slider 140 from a leading edge 154 to the trailing edge 156 of the slider 140 or head 104. Air flow along the air bearing surface 146 creates a pressure profile to support the head 104 and slider 140 above the medium 102 for read and/or write operations. As shown, the transducer portion 142 is formed at or near the trailing edge 156 of the slider 140.

As indicated earlier, the ever-increasing levels of recording density in data storage devices such as disc drives has caused a push for better write performance which, in turn, has resulted in certain write head designs that may have reliability problems. To address such problems, a high damping material may be employed in shields and/or a pole of a write head. A write head that includes a high damping material in its shields and/or poles is described below in connection with FIGS. 2A-2C.

Figure 2A:
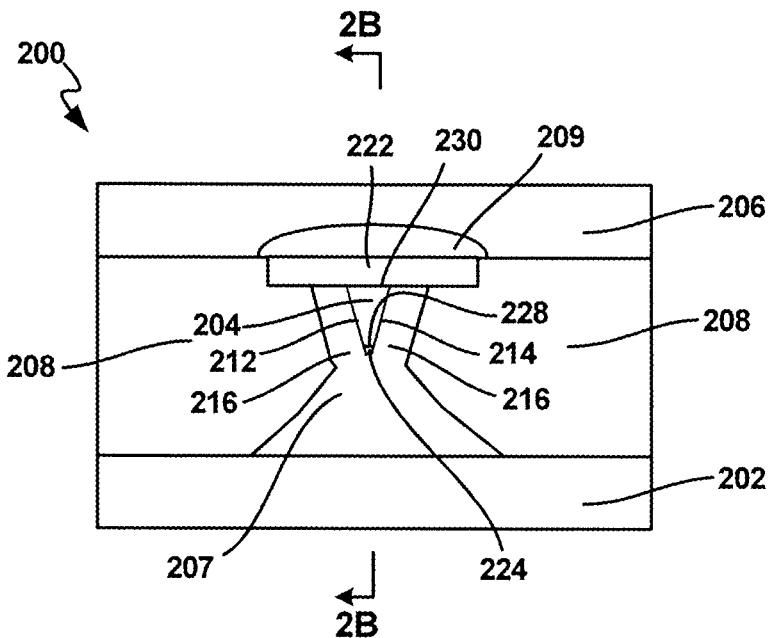
FIG. 2A depicts a bearing surface view of an example perpendicular magnetic recording (PMR) transducer.
Figure 2B:
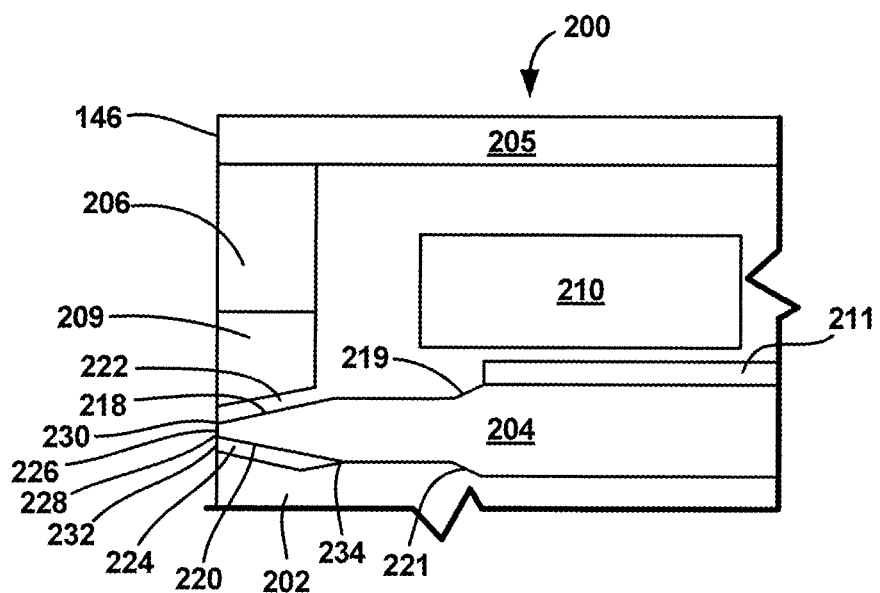
FIG. 2B depicts a side view of the PMR transducer of FIG. 2A.
Figure 2C:
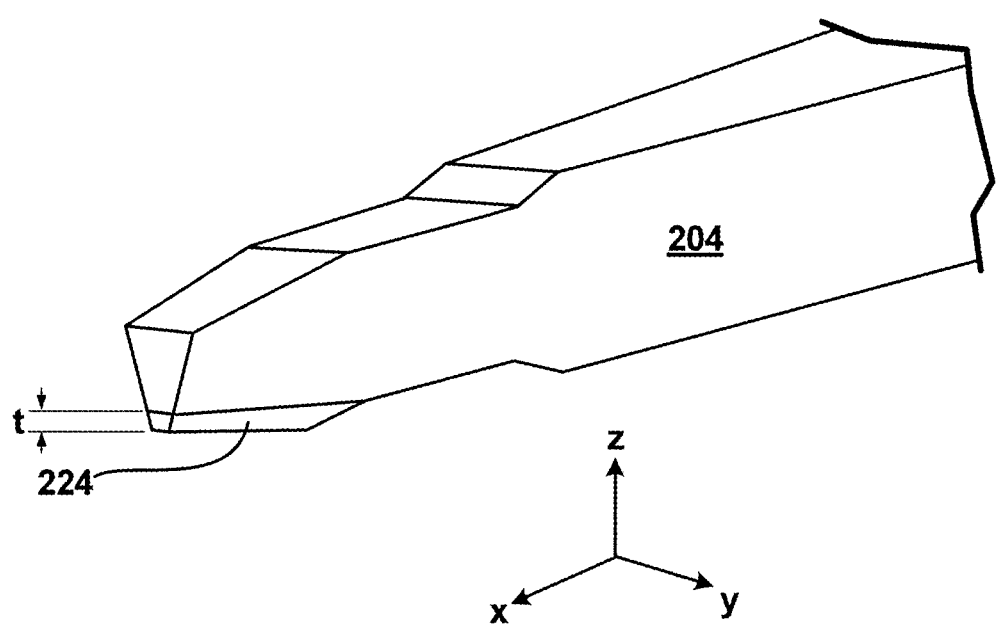
FIG. 2C depicts a perspective view of a portion of the PMR transducer of FIGS. 2A and 2B.

FIGS. 2A, 2B and 2C depict air bearing surface, side and perspective views, respectively, of a perpendicular magnetic recording (PMR) transducer or head 200 in accordance with one embodiment. The PMR transducer 200 may be a part of a merged head including the write transducer 200 and a read transducer (not shown). Alternatively, the magnetic recording head may be a write head only including the write transducer 200. The PMR transducer elements shown in FIGS. 2A, 2B and 2C are illustratively included in a recording head such as recording head 104 of FIGS. 1A and 1B.

The write transducer 200 includes an under-layer/substrate 202, a main pole 204, at least one return pole 205, a trailing edge shield 206 and side shields 208. The under-layer 202 may include multiple structures which are under the pole 204. The write transducer 200 may also include other components including but not limited to coils (denoted by reference numeral 210 in FIG. 2B) for energizing the main pole 204, and a yoke 211.

The main pole 204 resides over under-layer 202 and includes sidewalls 212 and 214. Sidewalls 212 and 214 are separated from the side shields 208 by non-magnetic side shield gaps (SSGs) 216. The top (trailing) surface of the main pole 204 also has a beveled portion 218. The bottom (leading) surface of the main pole 204 may further include a leading surface bevel 220. Additional beveled portions 219 and 221 may also be present behind the bearing surface 146. A trailing shield gap (TSG) 222 is formed between the main pole 204 and the trailing edge shield 206.

The write head 200 further includes a high damping magnetic alloy layer 224 attached to the leading surface bevel 220. Further, in some example, side shields 208 may include a high damping material. In still other examples, portions of trailing edge shield 206 or entire trailing edge 206 may include a high damping material. The high damping magnetic alloy layer 224 includes a magnetic material (e.g., Permalloy (NiFe), Fe, FeCo) infused with a small percentage of a transition $5d$ metal such as rhenium (Re), osmium (Os), iridium (Jr), etc. For example, the high damping material layer may be NiFeX, with X being the transition $5d$ metal having a content between about 1 and about 15 atomic (at) percent (%). A thickness (t in FIG. 2C) of high damping material layer 224 may be between about 10 nanometers (nm) and about 50 nm. In some cases, a thickness of high damping material layer 224 may be more than 50 nm. Shields 208 may similarly include a magnetic material infused with a small percentage of a transition $5d$ metal such as rhenium, osmium, iridium, etc. Such writer shields respond to flux leakage from the write pole 204 in a gentler manner, thereby improving the erasure fields by cutting-out peaks. In some examples, shields 208 may be laminated structures with at least one layer of the laminated structure including a small percentage of a transition $5d$ metal such as rhenium, osmium, iridium, etc., and at least one other layer not including any transition 5d metal. Also, in certain examples, entire trailing edge shield 206 or a portion of trailing edge shield 206 (e.g., portions other than 209) may include a magnetic material infused with a small percentage of a transition 5d metal such as rhenium, osmium, iridium, etc.

As can be seen in FIGS. 2A and 2B, at the bearing surface 146, the main pole 204 has a trapezoid shape with a front surface 226 that forms a portion of the bearing surface 146. The front surface 226 has a leading edge 228 and a trailing edge 230. In one example, the high damping material layer 224 has a front end 232 that is attached to the main pole 204 at the leading edge 228. As can be seen in FIG. 2B, the high damping material layer 224 extends from the front end at the leading edge 228 to a rear end 234 of the leading surface bevel 220. It should be noted that, in different examples, the high damping material may or may not cover the entire leading surface bevel 220.

In the examples described above in connection with FIGS. 2A and 2B, side shields 208 are split (e.g., side shields 208 are not connected below the leading edge or bottom edge 228 of the main pole 204). As can be seen in FIGS. 2A and 2B, the side shields are split by layer 207, which may be a non-magnetic or insulating material.

Figure 3A:
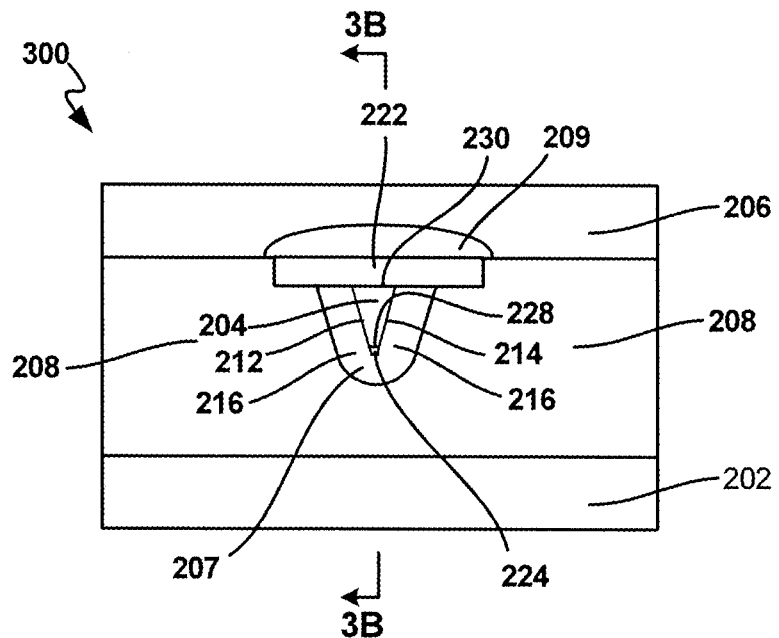
FIG. 3A depicts a bearing surface view of another example PMR transducer.
Figure 3B:
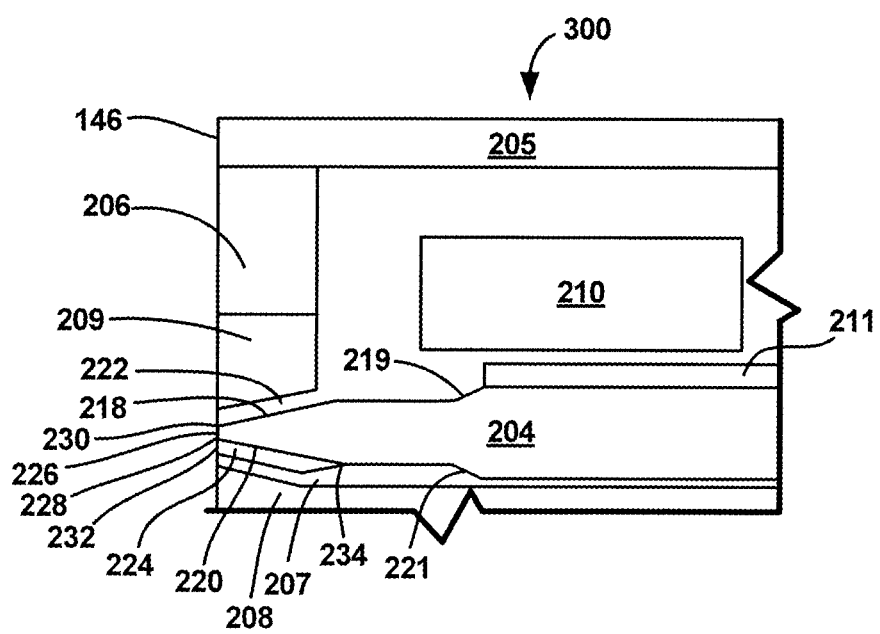
FIG. 3B depicts a side view of the PMR transducer of FIG. 3A.

FIGS. 3A and 3B depict air bearing surface and side views, respectively, of a perpendicular magnetic recording (PMR) transducer or head 300 that has a wrap-around shield configuration in accordance with another example. As can be seen in FIG. 3A, side shields 208 are connected below the leading edge or bottom edge 228 of the main pole 204. As in the case of the write head 200 (of FIGS. 2A and 2B), write head 300 may include a high damping material layer 224 attached to the leading surface bevel 220. Further, in some examples, connected side shields 208 of write head 300 may include a high damping material. In still other examples, entire trailing edge shield 206 or a portion of trailing edge shield 206 (e.g., portions other than 209) may include a high damping material.

As in the case of the write head 200 (of FIGS. 2A and 2B), in write head 300, the high damping material layer 224 may extend from the front end at the leading edge 228 to a rear end 234 of the leading surface bevel 220. In different examples, the high damping material may or may not cover the entire leading surface bevel 220. As noted above, in different embodiments, electrodeposition or electroplating may be used to form the elements with the high damping materials. One such electrodeposition or electroplating embodiment is described below in connection with FIG. 4.

Figure 4:
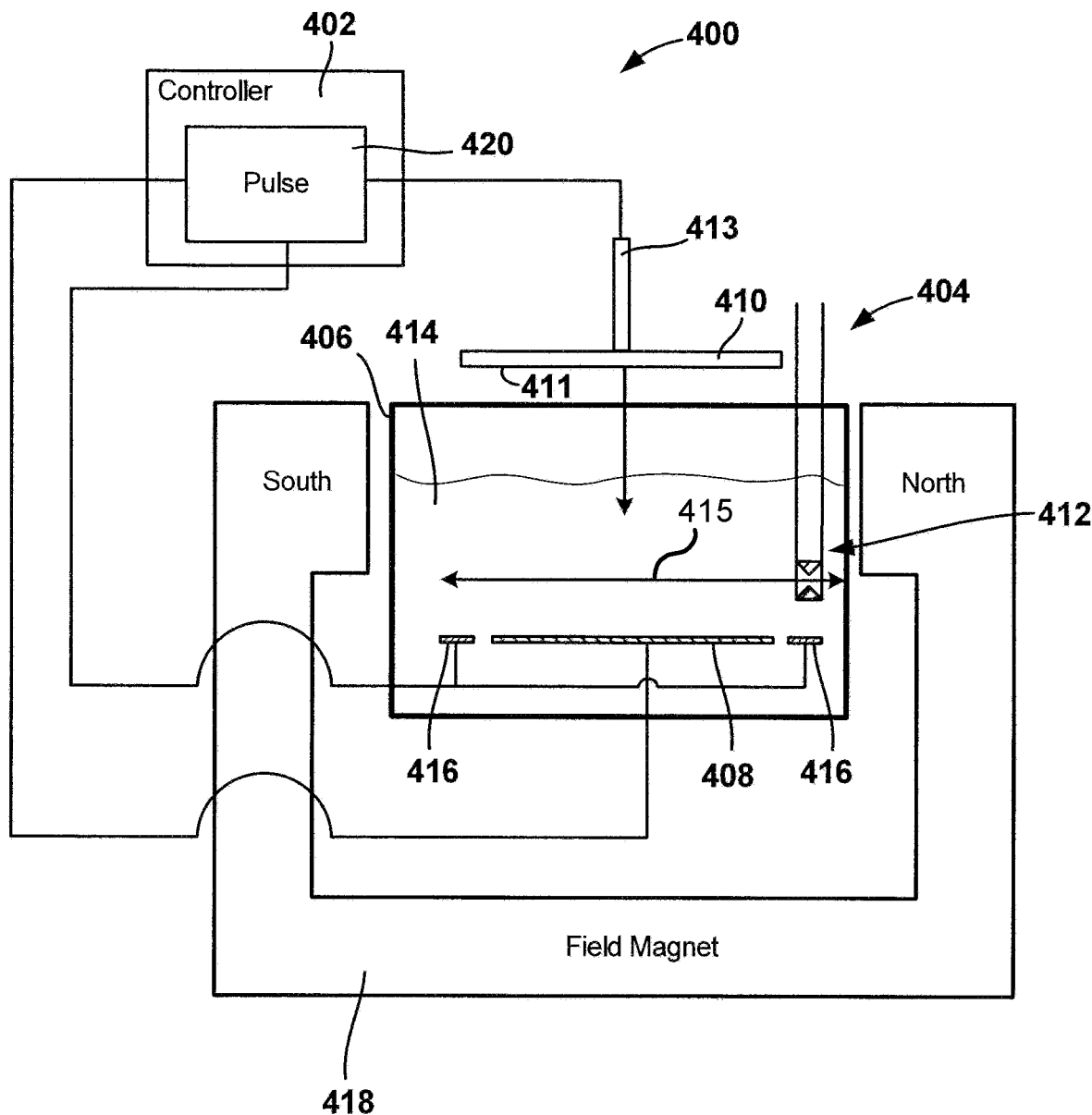
FIG. 4 is a diagrammatic illustration of an electroplating system in accordance with one embodiment.

FIG. 4 is a diagrammatic illustration of an electroplating system 400 in accordance with one embodiment. Electroplating system 400 includes control circuitry 402 and a plating tank 404. Plating tank 404 includes a container 406, an anode 408, a cathode 410, a paddle assembly 412, a solution or electrolyte 414, cathodic thief elements 416 and a magnet 418.

Container 406 may be made of any suitable material, which may not be electrically conductive (e.g., glass or plastic). Anode 408 is positioned within the container 406 and may be located relatively close to a bottom of the container 406 as shown in FIG. 4. Anode 408 may be formed of a wire mesh or a combination of a plate and a wire mesh. The plate and/or wire mesh may be formed of platinum (Pt) and/or Nickel (Ni).

Cathode 410 includes an electrically conductive wafer on which a high damping magnetic alloy is to be deposited. As can be seen in FIG. 4, the wafer 410 has an exposed surface 411 on which the high damping magnetic alloy is to be deposited. Surface 411 may include a photoresist pattern if only portions of surface 411 are to be deposited with the high damping magnetic alloy. If no photoresist pattern is included on surface 411, the high damping magnetic alloy will be deposited on the entire exposed surface 411. In some embodiments, the wafer includes an electrically conductive substrate and an electrically conductive seed layer (e.g., a NiFe seed layer) with surface 411 being an exposed surface of the electrically conductive seed layer. The cathode 410 may be releasably coupled to, and supported by, an arm 413 which, with the help of control circuitry 402, immerses the cathode 410 into the container 406 for deposition of the high damping magnetic alloy. In some embodiments, manual adjustments to a position of the arm 413 may be carried out in order to immerse the cathode 410 into the solution 414. Once the deposition process is complete, the wafer 410 with the high damping magnetic layer deposited thereon may be removed from the solution 414 by the arm 413 under the control of control circuit 402 and/or by manual adjustments of the position of the arm 413. The removed wafer 410 may then be detached from the arm 413. In should be noted that positioning the cathode 410 above the anode 408 within container 406 provides certain advantages. For example, if a high damping magnetic alloy layer is to be deposited on a number of wafers, positioning the cathode 410 in a manner shown in FIG. 4 allows for relatively rapidly attaching a first wafer to the arm 413, immersing the first wafer into the electrolyte substantially immediately after its attachment to the arm 413, carrying out the deposition of the high damping magnetic alloy layer, removing and detaching the first wafer, and then processing the next wafer in a similar manner. Further, bubbles that may be formed on the cathode 410 during electrodeposition move in an upward direction and may escape from the electrolyte 414 instead of attaching to the cathode. In spite of different advantages with the cathode 410 positioned above the anode 408, in certain embodiments, the positions of the cathode 410 and the anode 408 may be reversed.

In general, solution/bath/electrolyte 414 within container 406 may include several compounds that are suitable for deposition of the high damping magnetic alloy. Examples of compounds that may be used to deposit a NiFeX high damping magnetic layer on the wafer 410 are included in Table 1 below.

TABLE 1

| COMPOUND | RANGE/VALUE |
|---|---|
| $H_3BO_3$ | about 0.15 to about 0.6 moles/liter |
| $Ni^{2+}$ | about 0.18 to about 0.4 moles/liter |
| Organic additives | about 0.8 grams/liter |
| sodium lauryl sulfate or sodium dodecyl sulfate | about 0.1 grams/liter |
| $Fe^{2+}$ | about 0.015 to about 0.03 moles/liter |
| X elements (e.g., Re, Ir, Os) | about 0.005-0.4 millimolar |
| $Fe^{3+}$ | between about 0.001 gram/liter to about 0.01 gram/liter |
| pH | about 2 to about 3 |

Sources of $Ni^{2+}$ and $Fe^{2+}$ may include chlorides, sulfates and perchlorates, and X elements may be any salt including that element and that is dissolvable in an aqueous solution. Solution or bath 414 may substantially constantly be stirred by reciprocating mixing element or paddle 412, which travels back and forth (as shown by bidirectional arrow 415) below surface 411 of the wafer 410. Paddle 412 is typically in close proximity with surface 11 and provides the agitation of the bath 414 with minimum turbulence.

In the embodiment if FIG. 4, controller 402 includes pulse current supply circuitry 420, which is electrically coupled to anode 408, to cathode/wafer 410 and to cathodic thief elements 416. Cathodic thief elements 416 may be in a substantially same plane as the anode 408 and are included to steal current away from edges of the wafer 410, and thereby help ensure that the deposition on the wafer 410 is uniform. It should be noted that, in some embodiments, pulse current supply circuitry 420 may be separate from controller 402. During operation, to supply a pulse current, circuitry 420 may toggle the current between high and low values (e.g., circuitry 420 may be turned on and off for predetermined intervals of time) to provide suitable deposition conditions. Table 2 below includes examples of deposition conditions.

TABLE 2

| CONDITION | RANGE/VALUE |
|---|---|
| time that current supply circuitry is on (t_on) | 10-400 milliseconds |
| time that current supply circuitry is off (t_off) | 20-1000 milliseconds |
| pulse peak current density (I) | about 15 milliamperes/square centimeter to about 60 milliamperes/square centimeter |
| rate of formation of the high damping magnetic alloy layer | about 40-100 nanometers/minute |

An electrolyte provided as show in Table 1 and the conditions shown in Table 2 may be used in the apparatus of FIG. 4 to form $(Ni_{60-40}Fe_{40-60})_{87-95}X_{5-13}$ with the following properties:

Stress between about 150 to about 250 mega pascals (MPa).

Saturation magnetization (Bs) between about 0 to about 1.6 Tesla.

Easy axis coercivity (Hce) between about 2 to about 4 Oersted.

Hard axis coercivity (Hch) between about 0 to about 0.4 Oersted.

Damping constant: between about 0.005 (for 0 doping) to about 0.03 (for 10 (at) % doping).

Uniformity between about 6 to about 8%, where uniformity=range (e.g., maximum−minimum)/mean. An example that illustrates formation of a high damping magnetic alloy layer in accordance with the above-described electrodeposition process is provided below in connection with FIGS. 5A through 5C.

Figure 5A:
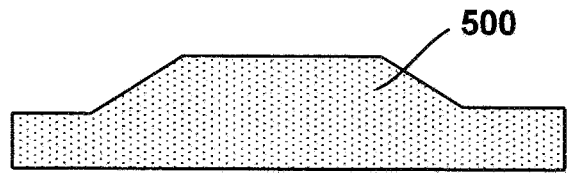
FIGS. 5A-5C illustrate process steps for forming a portion of a PMR transducer of the type shown in FIGS. 2A and 2B using the electroplating system of FIG. 4.

FIG. 5A illustrates a side view of an under-layer 500 on which a main pole (such as 204 of FIGS. 2A, 2B and 2C) with a high damping magnetic alloy layer (such as 224 of FIGS. 2A, 2B and 2C) is to be formed. The high damping magnetic alloy layer that forms part of the main pole may be formed by an electrodeposition process of the type described above in connection with FIG. 4. It should be noted that under-layer 500 illustrated in FIG. 5A is a partial structure of a single write head, which, in turn, is part of a wafer that includes a plurality of write head structures.

Figure 5B:
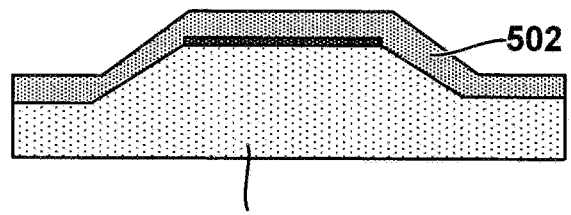

In accordance with one embodiment, the wafer including under-layer 500 is attached to arm 413 (of FIG. 4), immersed in solution 414 (of FIG. 4) and supplied with a pulsed current in a manner described above in connection with FIG. 4. This results in the formation of a high damping magnetic alloy layer 502 on the wafer that includes that under-layer 500 as shown in FIG. 5B. Once layer 502 is formed, the wafer including layers 500 and 502 is removed from the solution 414 (of FIG. 4) and detached from the arm 413 (of FIG. 4).

Figure 5C:
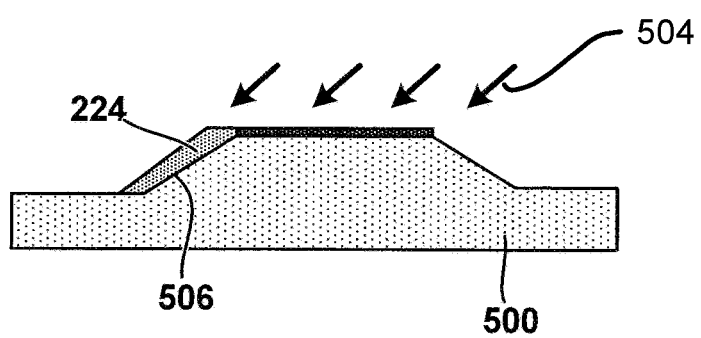

A material removal operation may then be carried out on layer 502 to leave behind portion 224. FIG. 5C illustrates a side view of a partial write transducer structure formed after the material removal operation (e.g., milling) is carried out on layer 502. As can be seen in FIG. the milling operation (denoted by reference numeral 504 in FIG. 5C) is conducted at such an angle so that the part 224 of the high damping magnetic alloy layer 502 is protected from the milling operation. For example, the milling operation is conducted at an angle that is lower (as compared to the horizontal surface) compared to an angle of a bevel 506 (again, as compared to the horizontal surface). The milling operation 504 mills away most of the high damping magnetic alloy layer 502, except for the material that is protected due to the angle of the bevel 506. After formation of high damping magnetic alloy layer 224, layer 204 (of FIGS. 2A, 2B and 2C) is formed on the structure shown in FIG. 5C using any suitable technique. It should be noted that the embodiment described in connection with FIGS. 5A, 5B and 5C involves sheet film deposition of layer 502 by an electrodeposition process. In an alternate embodiment, a photoresist pattern may be formed on under-layer 500 prior to the electrodeposition process. Electrodeposition may then be carried out on the patterned wafer to provide feature 224 without using the material removal process shown in FIG. 5C.

As noted above, the inclusion of high damping magnetic alloy layers in poles and/or shields of write heads provide reliability improvements. Further, a manner in which electrodeposition is carried out has an impact on the quality of the deposited high damping magnetic alloy layer. For example, electrodeposition carried out in a manner described above using pulsed currents has advantages over electrodeposition carried out using direct current (DC). A general electrodeposition method using a pulsed current is described below in connection with FIG. 6. That description is followed by a description of certain impactful factors of pulse plating parameters in connection with FIGS. 7-10. Thereafter, comparison results for pulsed current versus DC electrodeposition are described further below in connection with FIGS. 11 through 17.

Figure 6:
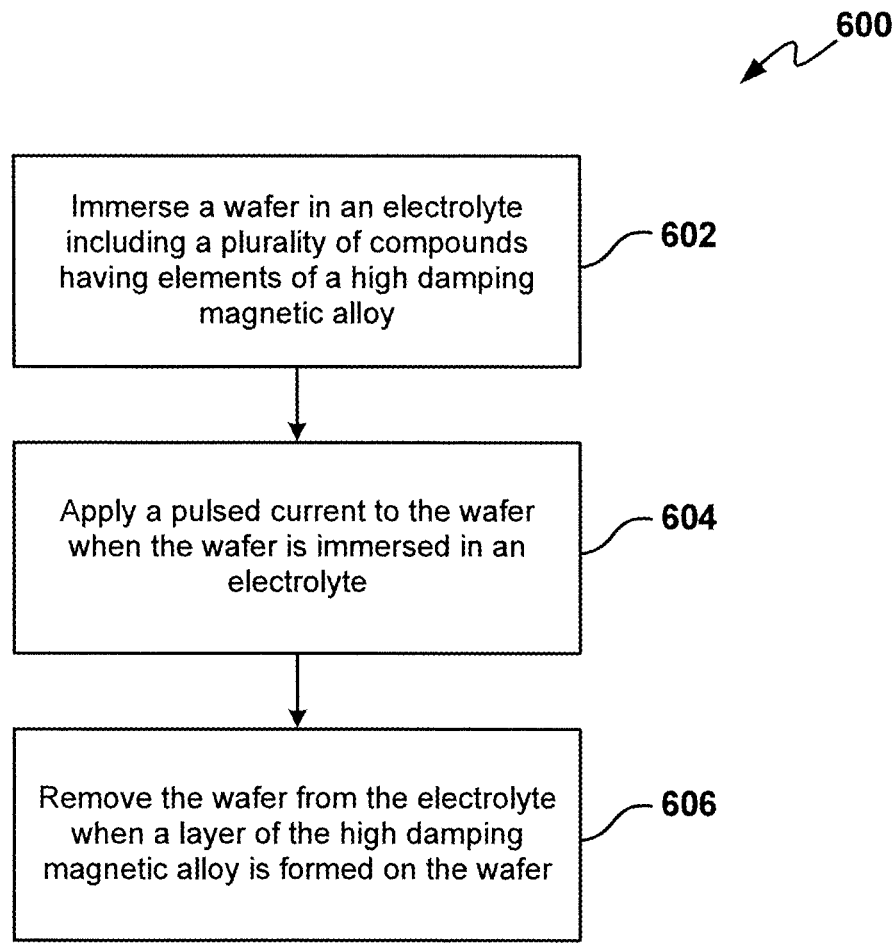
FIG. 6 is a flow diagram of a method embodiment.

FIG. 6 is a flow diagram 600 of a method embodiment. The method includes, at step 602, immersing a wafer in an electrolyte including a plurality compounds having elements of a high damping magnetic alloy. At step 604, a pulsed current is applied to the wafer when the wafer is immersed in an electrolyte. At step 606, the wafer is removed from the electrolyte when a layer of the high damping magnetic alloy is formed on the wafer.

Figure 7:
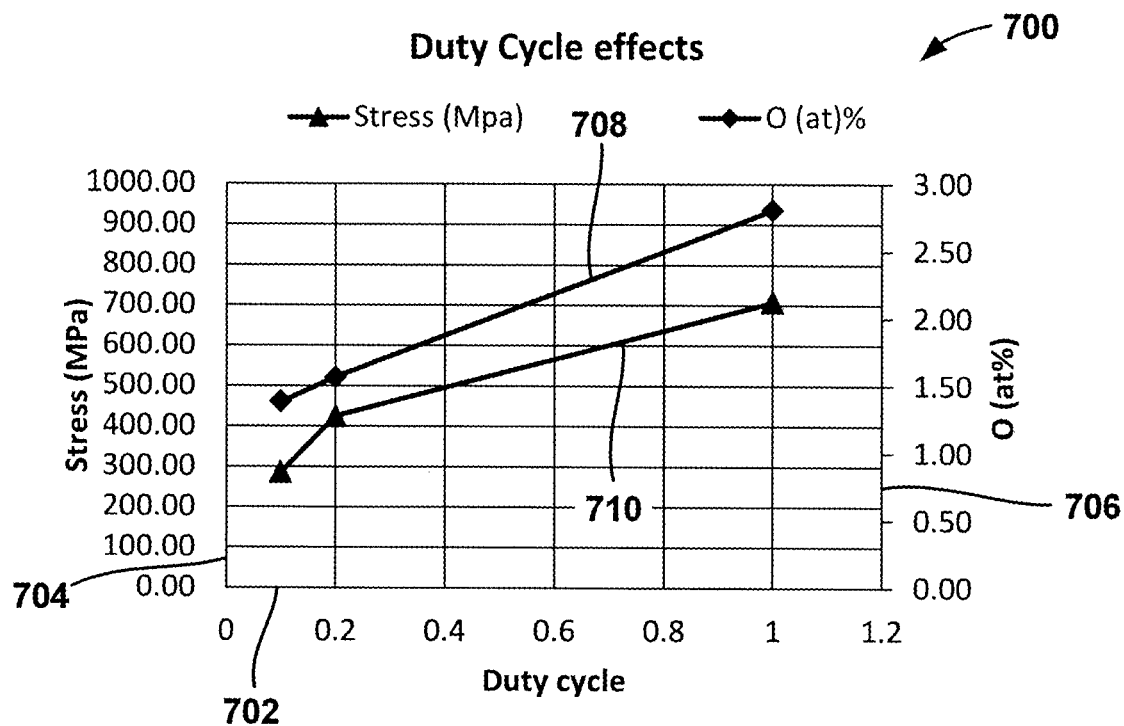
FIGS. 7 and 8 are graphs showing an impact of a duty cycle on properties of NiFeX.

A pulse plating duty cycle (defined by t_on/(t_on+t_off)) may have an impact on obtaining NiFeX films with a low impurity (e.g., oxygen (O)) level, which is important for favorable material properties. A low duty cycle may be employed for obtaining NiFeX films with superior properties. FIG. 7 is a graph 700 that shows the effects of duty cycle on oxygen content and stress. In FIG. 7, horizontal axis 702 represents duty cycle values, left vertical axis 704 represents stress in MPa and right vertical axis represents at % of O. Plot 708 connects O content values in NiFeX obtained with different duty cycle values. Plot 710 connects stress values for NiFeX over different duty cycle values. As can be seen in FIG. 7, a low duty cycle results in both low O content and low stress in a NiFeX film. The lower the 0 and stress, the better the properties of the NiFeX film.

Figure 8:
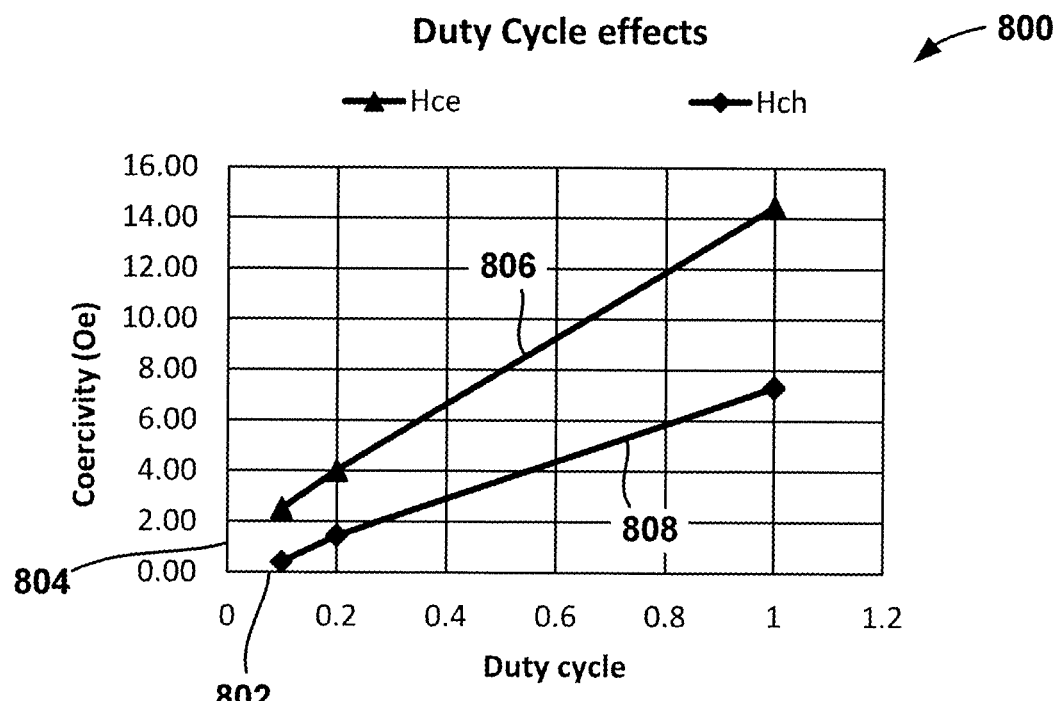

FIG. 8 is a graph 800 that shows the effects of duty cycle on magnetic coercivity. In FIG. 8, horizontal axis 802 represents duty cycle values and vertical axis 804 represents coercivity in Oe. Plot 806 connects Hce values over different duty cycle values. Plot 810 connects Hch values over different duty cycle values. As can be seen in FIG. 8, low duty cycle values result in low Hce and Hch values, which is desirable.

Figure 9:
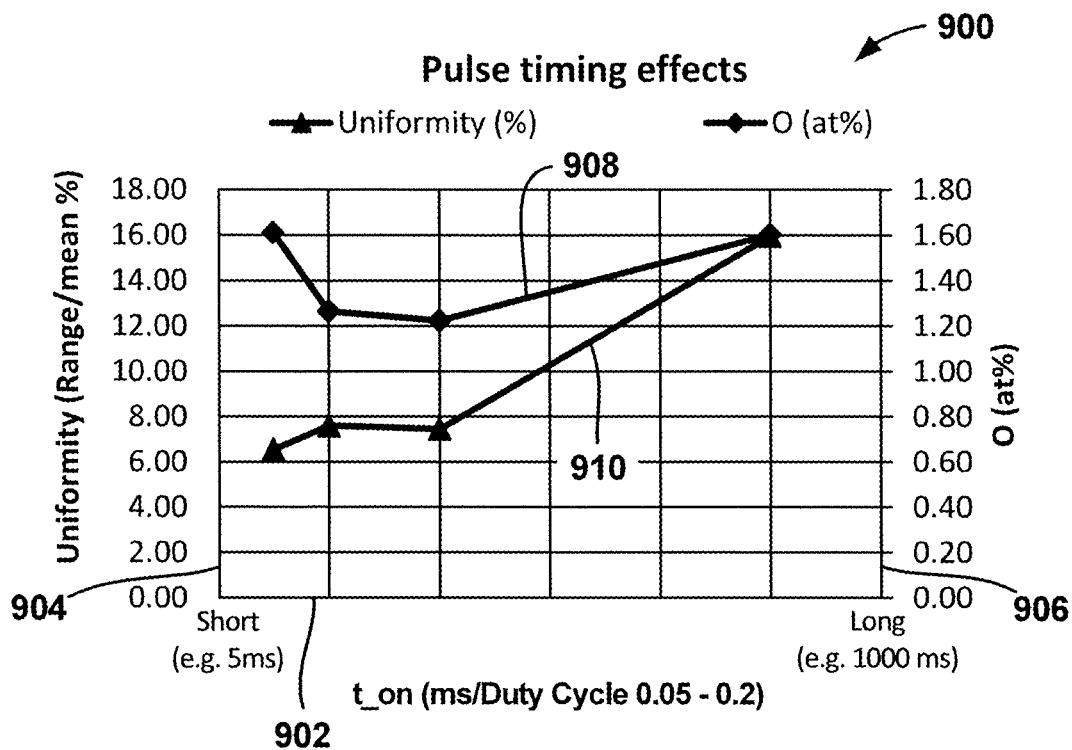
FIGS. 9 and 10 are graphs showing an impact of a pulse on time on properties of NiFeX.

To obtain NiFeX with high damping and superior magnetic properties, the pulse timing (pulse on time (t_on)) is another factor to control. FIG. 9 is a graph 900 that shows the effects of t_on on impurity O and on film uniformity. In FIG. 9, horizontal axis 902 represents t_on in milliseconds (ms)/duty cycle of 0.05 to 0.2, first vertical axis 904 represents uniformity in range/mean %, and second vertical axis 906 represents at % of O. Plot 908 connects uniformity values for NiFeX over different t_on values. Plot 910 connects O content values in NiFeX obtained with different t_on values. As can be seen in FIG. 9, with the same duty cycle (t_on/(t_on+t_off)), the impurity content (e.g., O content) is minimum when t_on is between Also, plot 910 shows that film uniformity is optimal when t_on is between 20-40 ms.

Figure 10:
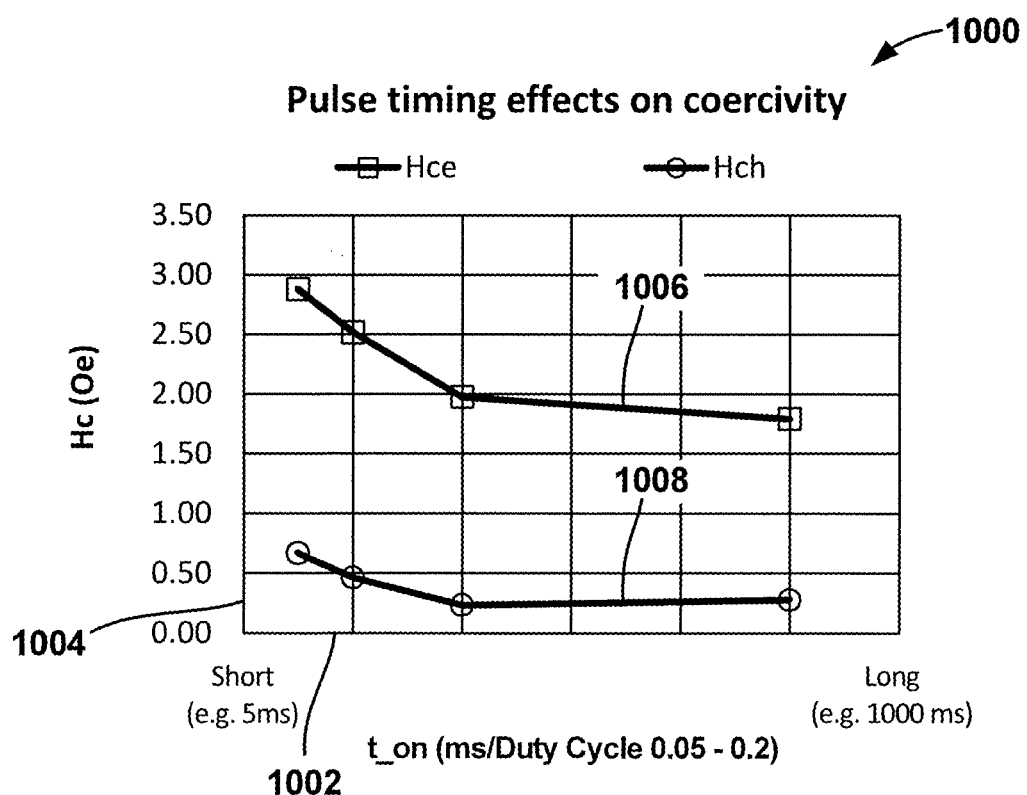

FIG. 10 is a graph 1000 that shows the effects of t_on on magnetic coercivity. In FIG. 10, horizontal axis 1002 represents t_on in ms/duty cycle of 0.05 to 0.2 and vertical axis 1004 represents coercivity in Oe. Plot 1006 connects Hce values over different t_on values. Plot 1008 connects Hch values over different t_on values. As can be seen in FIG. 10, Hce and Hch are in an optimal range (e.g., low) when t_on is between 20-40 ms.

The following table (Table 3) shows that, by using the bath chemistry of Table 1 and the pulse plating parameters (e.g., t_on and t_off times provided above in connection with FIGS. 7-10), NiFeX with a very low impurity level may be obtained. With the low impurity levels shown in Table 3 below, superior physical and magnetic properties, including a high damping constant, may be achieved.

TABLE 3

| O (at %) | S (at %) | C (at %) | Cl (at %) | F (at %) |
|---|---|---|---|---|
| <about 0.102 | <about 0.172 | <about 0.11 | <about 0.0044 | <about 1.60E−05 |

In Table 3, Ni, Fe and X are not shown. The values included in Table 3 are obtained from secondary-ion mass spectrometry (SIMS).

Figure 11:
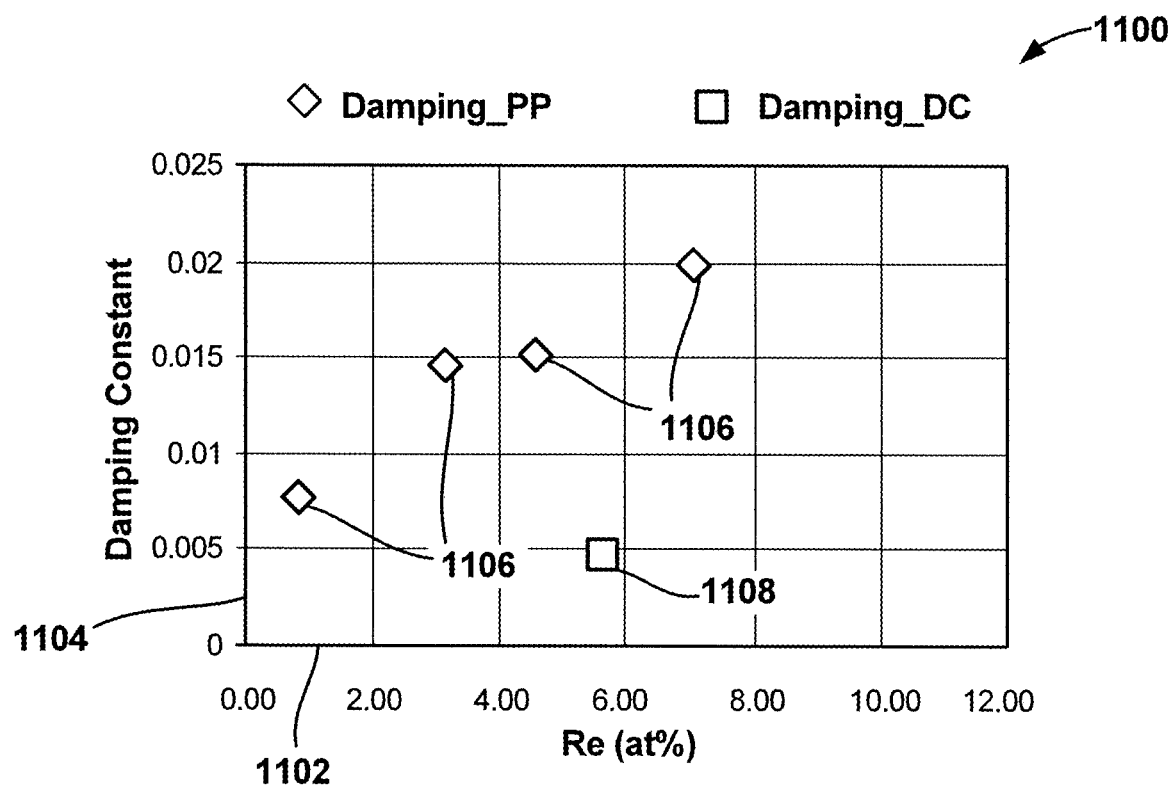
FIGS. 11-15 are graphs that plot results obtained for NiFeRe films formed by electrodeposition.

As will be described below in connection with FIGS. 11-18, NiFeX (e.g., NiFeRe) formed by electrodeposition using pulsed current (for example, with t_on and t_off times provided above in connection with FIGS. 7-10) provides substantial and unexpected improvements relative to NiFeX (e.g., NiFeRe) formed by electrodeposition using direct current. For example, damping constant values for NiFeX (e.g., NiFeRe) are substantially higher when pulsed current electrodeposition is used (for example, with t_on and t_off times provided above in connection with FIGS. 7-10) instead of direct current electrodeposition for a similar Re doping level. Also, as indicated in Table 3 and FIG. 13, impurity levels in NiFeX (e.g., NiFeRe) are substantially and unexpectedly low when pulsed current electrodeposition is used (for example, with t_on and t_off times provided above in connection with FIGS. 7-10). Pulse plating with t_on and t_off times provided above in connection with FIGS. 7-10 was employed in an attempt to improve magnetic properties (e.g., improve coercivity) of NiFeX (e.g., NiFeRe) relative to magnetic properties of NiFeX (e.g., NiFeRe) formed by electrodeposition using direct current. However, in addition to providing an improvement in magnetic properties, the pulse plating unexpectedly fundamentally changed the microstructure of NiFeX by producing fine and homogeneous grains in contrast with relatively large crystalline grains of a NiFeX (e.g., NiFeRe) film obtained using direct current deposition. This was accompanied by an unexpected improvement in a damping constant value (e.g., doubling of the damping constant value) as indicated above at a low level of doping concentration of about 3 (at) % as shown in FIG. 11. Thus, the improvements in magnetic properties that one of ordinary skill in the art may have expected were accompanied by the above-noted unexpected results.

FIG. 11 is a graph 1100 that illustrates a comparison of damping constant values obtained for NiFeRe formed by electrodeposition using pulsed current and by electrodeposition using direct current. In FIG. 11, horizontal axis 1102 represents atomic percent (at %) of Re and vertical axis 1104 represents damping constant. Points 1106 are damping constant values obtained for NiFe with different doping levels of Re when a pulsed current is used for the electrodeposition process. Point 1108 is a damping constant value obtained for NiFe doped with Re when DC is used for the electrodeposition process. As can be seen in FIG. 11, damping constant values for NiFeRe are substantially higher when pulsed current electrodeposition is used for a similar Re doping level. Also, as can be seen in FIG. 11, in pulse current deposited NiFeRe, the damping constant increases linearly with Re (at) %. However, DC deposited NiFeRe does not show damping improvement with an increase in Re (at) %.

Figure 12A:
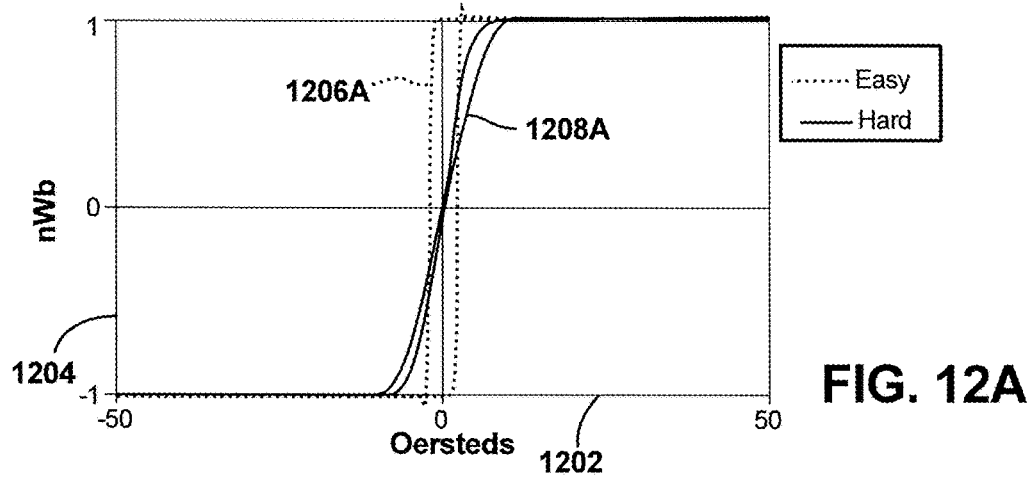
Figure 12B:
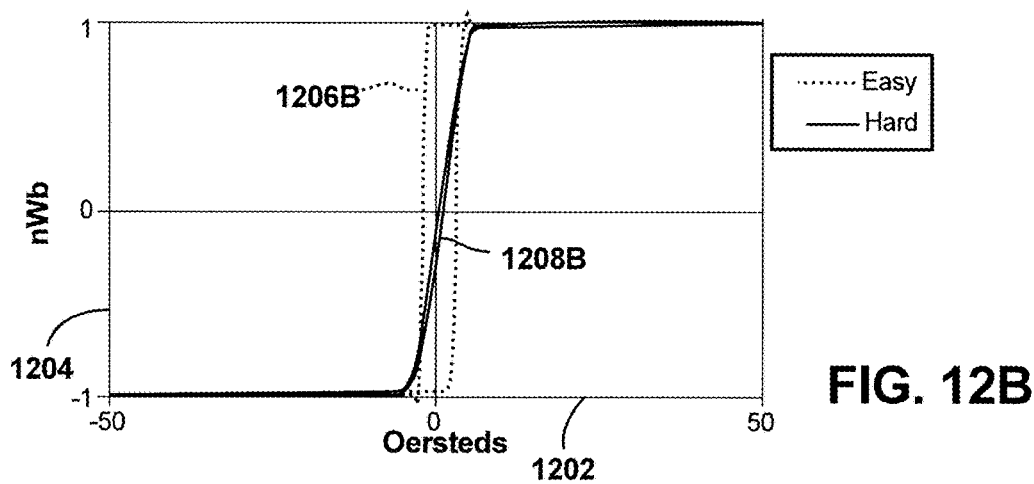
Figure 12C:
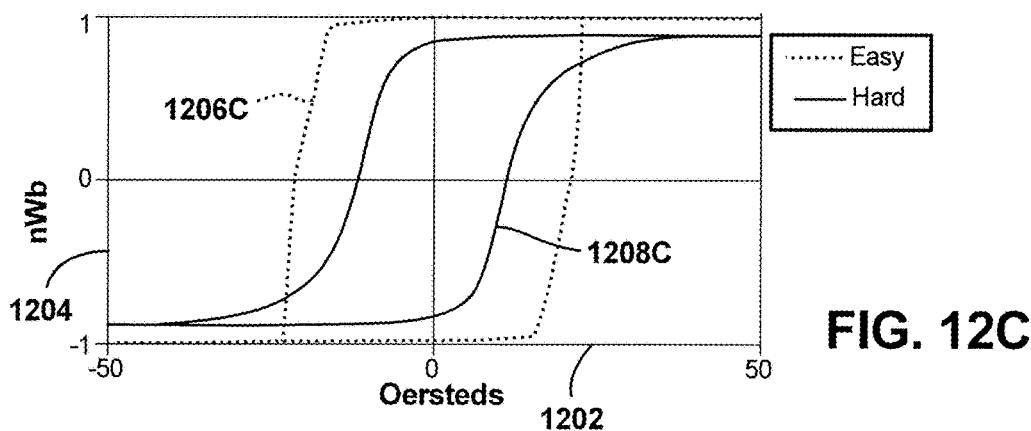

FIGS. 12A, 12B and 12C show magnetic hysteresis loops obtained for $Ni_{45}Fe_{55}$, $(Ni_{45}Fe_{55})_{95}Re_5$ formed by electrodeposition using pulsed current, and $(Ni_{45}Fe_{55})_{95}Re_5$ formed by electrodeposition using DC, respectively. In FIGS. 12A, 12B and 12C horizontal axis 1202 represents an applied magnetic field (H) in Oersted (Oe) and a vertical axis 1204 represents normalized flux. In FIGS. 12A, 12B and 12C, loops 1206A, 1206B and 1206C, respectively, are easy axis magnetic loops and loops 1208A, 1208B and 1208C are respective hard axis loops. As can be seen in FIGS. 12A, 12B and 12C, pulse current deposited $(Ni_{45}Fe_{55})_{95}Re_5$ shows superior magnetic properties compared with $Ni_{45}Fe_{55}$ and DC deposited $(Ni_{45}Fe_{55})_{95}Re_5$. For example, hard axis loop 1208B of FIG. 12B includes lines that correspond in shape and substantially overlap over the entire range of magnetic field values, which is not the case with loops 1208A (FIG. 12A) and 1208B (FIG. 12B).

Figure 13:
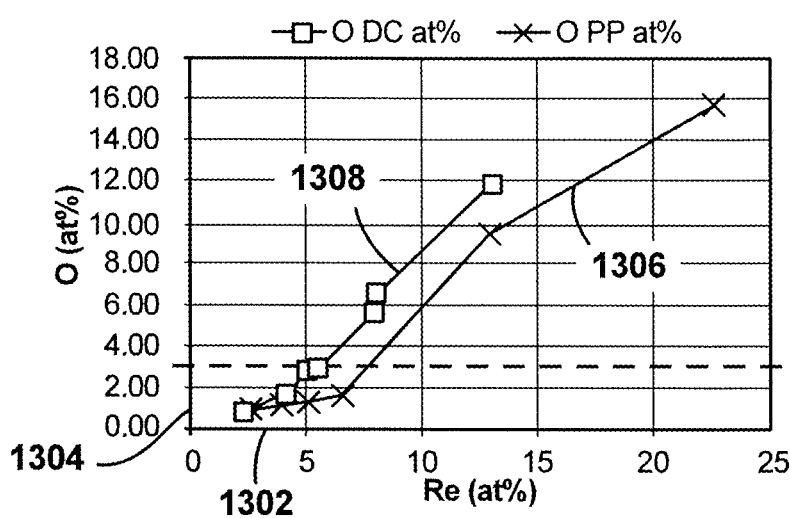

FIG. 13 is a graph 1300 that illustrates a comparison of O content values obtained for NiFeRe formed by electrodeposition using pulsed current and electrodeposition using direct current. In FIG. 13, horizontal axis 1302 represents atomic percent (at %) of Re and vertical axis 904 represents (at) % of O. Plot 1306 connects O content values for NiFe with different doping levels of Re when a pulsed current is used for the electrodeposition process. Plot 1308 connects content values for NiFe doped with Re when DC is used for the electrodeposition process. As can be seen in FIG. 13, O content generally increases with Re content. In addition, DC deposited NiFeRe contains significantly more O than pulse deposited NiFeRe, which results in high stress and worse magnetics for DC deposited NiFeRe films.

Figure 14:
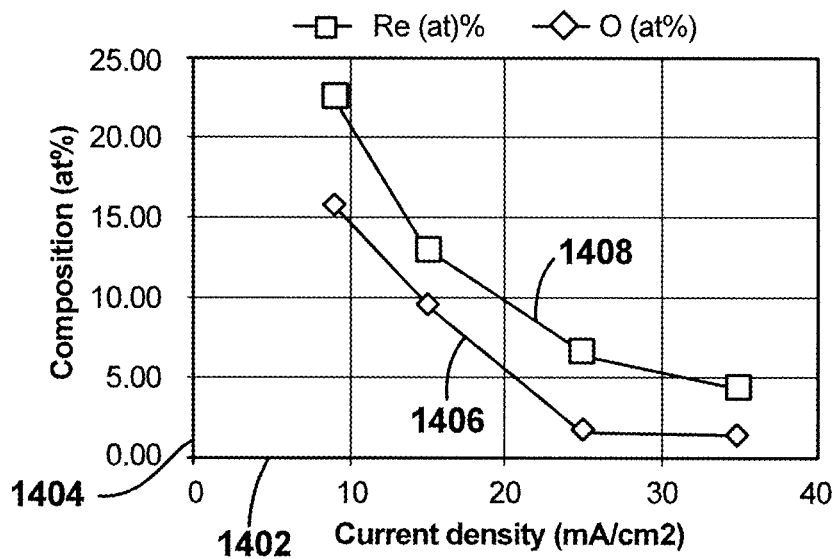

FIG. 14 is a graph 1400 that illustrates variation of Re and O with variation in current density in the deposition of NiFeRe. In FIG. 14, horizontal axis 1402 represents current density (I) in milliamperes/square centimeter (mA/cm$^2$) and vertical axis 1404 represents (at) % of O and Re. Plot 1406 connects O content values in NiFeRe for different current density values, and plot 1408 connects Re values for different current density values. As can be seen in FIG. 14, by changing plating current density, both O and Re content can be varied based on design needs. In addition, both O and Re content decreases with an increase in current density.

Figure 15:
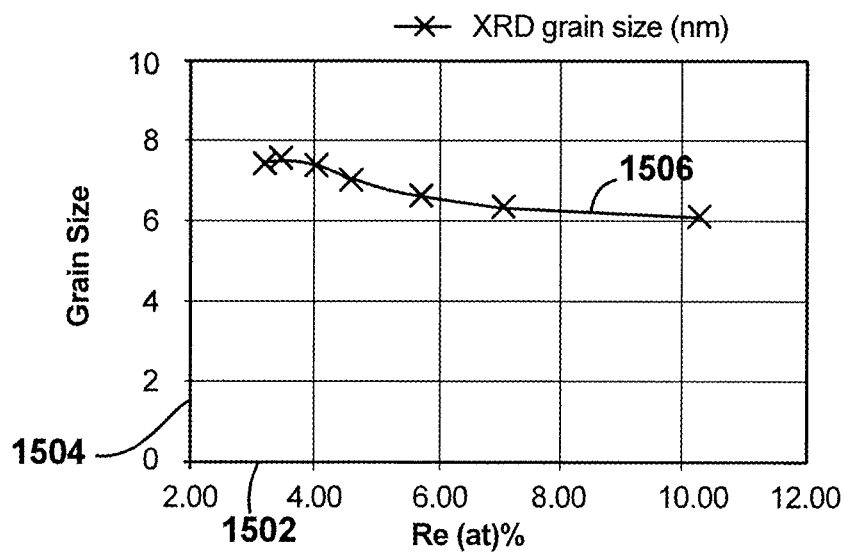

FIG. 15 is a graph 1500 that illustrates variation of grain size in pulse current deposited NiFeRe with variation in Re content. In FIG. 15, horizontal axis 1502 represents (at) % of Re and vertical axis 1504 represents grain size in nanometers (nm). Plot 1506 shows that grain size decreases with an increase in Re content.

Figure 16A:
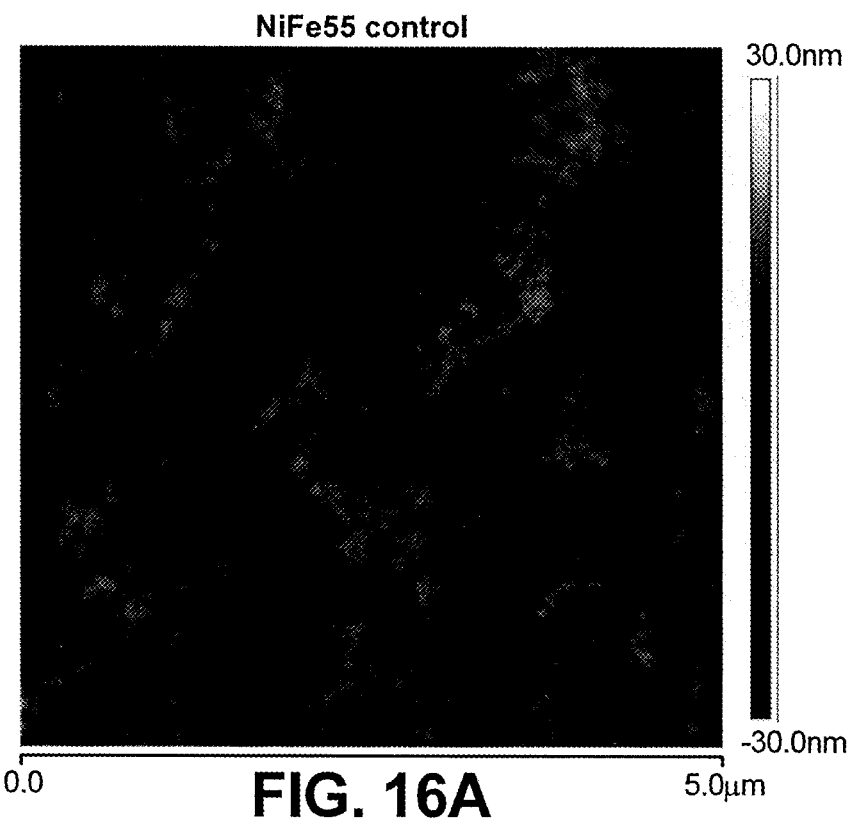
FIGS. 16A, 16B and 16C show topographical images of films formed by electrodeposition.
Figure 16B:
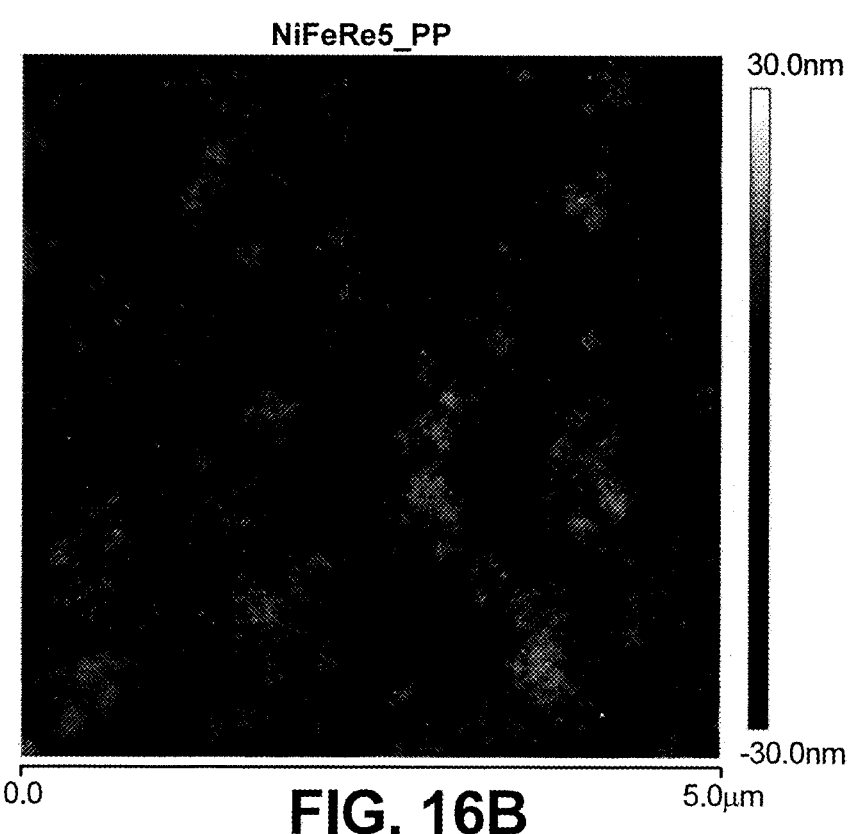
Figure 16C:
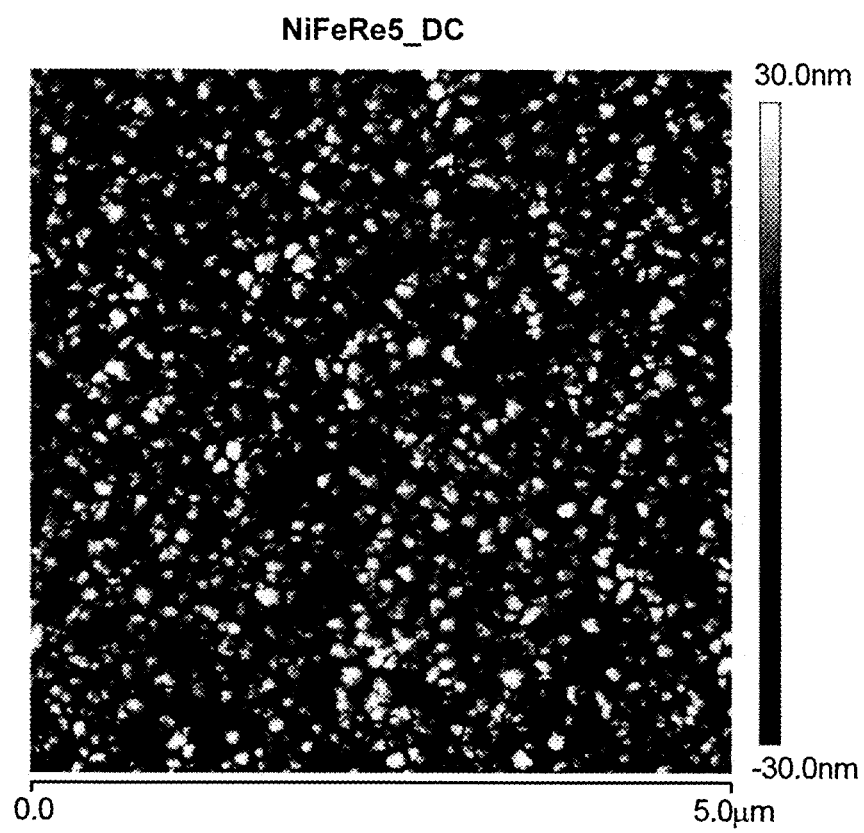

FIGS. 16A, 16B and 16C show topographic images, generated from atomic force microscopy, of $Ni_{45}Fe_{55}$, $(Ni_{45}Fe_{55})_{95}Re_5$ formed by electrodeposition using pulsed current, and $(Ni_{45}Fe_{55})_{95}Re_5$ formed by electrodeposition using direct current, respectively. A comparison of images of FIGS. 16A, 16B and 16C show that pulse current deposited NiFeRe has a substantially smooth surface, which is similar to the $Ni_{45}Fe_{55}$ film surface that serves as the baseline or reference. However, the DC deposited NiFeRe is substantially rough.

Figure 17:
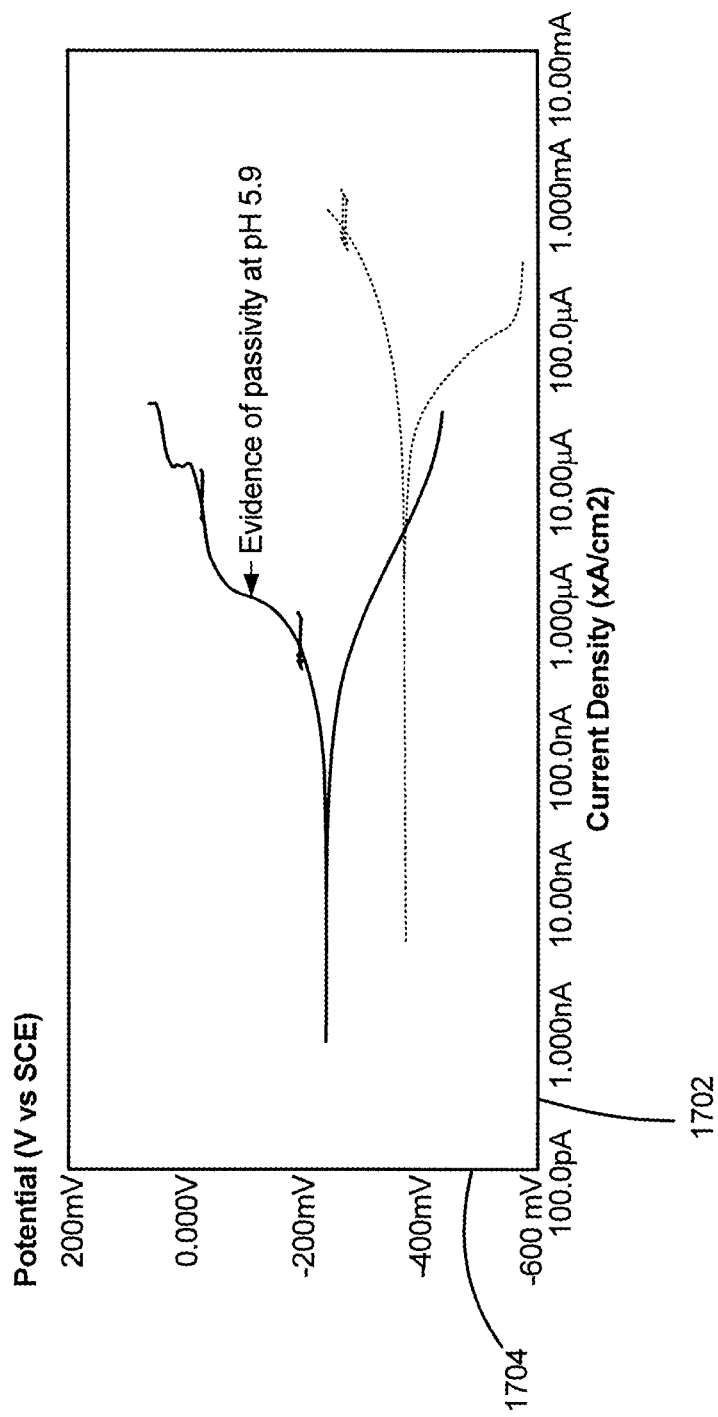
FIG. 17 is a graph showing plots related to corrosion properties of films.

FIG. 17 is a graph showing plots of corrosion properties of $(Ni_{45}Fe_{55})_{95}Re_5$ in NaCl 0.1 mole/liter with pH 3 and 5.9, respectively. In FIG. 17, horizontal axis 1702 represents current density (I) in microamperes/square centimeter (uA/cm$^2$) and vertical axis 1704 represents potential (voltage (V) vs saturated calomel electrode (SEC) reference). Table 4 below includes corrosion-related results for $Ni_{41}Fe_{55}Re_4$, NiFe21.5 weight percent (Wt %) and NiFe55 Wt %.

TABLE 4

| NaCl 0.1 mole/liter | pH 3: $E_{corr}$(V vs. SCE) | pH 3: $i_{corr}$(uA/cm$^2$) | pH 5.9: $E_{corr}$(V vs. SCE) | pH 5.9: $i_{corr}$(uA/cm$^2$) |
|---|---|---|---|---|
| $(Ni_{45}Fe_{55})_{95}Re_5$ | −0.37 | 24 | −0.24 | 0.4 |
| $Ni_{78.5}Fe_{21.5}$ Wt. % | −0.36 | 20 | −0.24 | 0.2 |
| $Ni_{45}Fe_{55}$ Wt % | −0.40 | 20 | −0.25 | 0.4 |

The results in Table 4 show that a NiFeRe film has excellent and comparable corrosion properties to $Ni_{78.5}Fe_{21.5}$ and $Ni_{45}Fe_{55}$ reference films. Further, NiFeRe shows passivity in pH 5.9 NaCl corrosion media.

The above-described embodiments primarily deal with forming layers of high damping magnetic alloys with a damping constant that may be as high as about 0.03. In such embodiments, the high damping constant may result from intrinsic mechanisms such as a fundamental interaction/coupling of spins and orbits, phonon drag, eddy currents, etc. In addition to the intrinsic mechanisms, extrinsic mechanisms (e.g., imperfect sample with different grain sizes, local resonance field distribution, two-magnon scatter and magnetic inhomogeneities) may also be a resource for magnetic damping. In embodiments described below, through crystal structure and microstructure controls, a key contribution to ultrahigh damping is obtained from extrinsic resources besides intrinsic sources.

As noted above, a high damping material layer may include NiFeX, with X being a transition 5d metal. Embodiments of the disclosure recognize that a weight percentage of Fe and an atomic percentage of X in NiFeX have an impact on a crystalline structure of the high damping material layer, and that the high damping magnetic layer may have an ultrahigh damping constant of about 0.07 when is has a combined face-centered cubic (fcc) and body-centered cubic (bcc) crystal structure. Different example crystalline structures for different wt % and at % ranges of Fe and X, respectively, in $(Ni_{100-n}Fe_n)_{100-m}X_m$, where n in a wt % and m is an at %, are included below.

$NiFe_{n<60}X_{m=2-5}$ has a predominantly fcc crystalline structure. In $NiFe_{n<60}X_{m=2-5}$, damping increases with X (e.g., Re) due to intrinsic mechanisms.

$NiFe_{n=61-70}X_{m=35-6}$ has a mixed fcc and bcc crystalline structure. Here, damping can be significantly increased by nanostructure engineering. For example, a coexistence of 20-50 nm bcc grains (with slip deformation inside) and about 10 nm fcc grains causes stress/strain at an fcc-bcc interface, which significantly enhances damping.

$NiFe_{n>70}X_{m<4}$ has a predominantly bcc crystalline structure. In $NiFe_{n>70}X_{m=<4}$, damping is generally higher than in $NiFe_{n<60}X_{m=2-5}$ (the predominantly fcc phase), possibly due to slip deformation inside the bcc grains, which increases the extrinsic contribution to damping.

A layer of NiFeX may be deposited on a wafer using the electroplating system of FIG. 4 such that the layer formed may have a mixed fcc and bcc crystalline structure. An electrolyte that is suitable for the formation of the mixed fcc and bcc layer may be employed, and the electroplating process may be tailored to favor the formation of the mixed fcc and bcc layer of NiFeX. Examples of compounds that may be used to deposit a NiFeX ultra high damping magnetic layer on a wafer (e.g., 410 of FIG. 4) are included in Table 5 below.

TABLE 5

| COMPOUND | RANGE/VALUE |
|---|---|
| $H_3BO_3$ | about 0.15 to about 0.6 moles/liter |
| $Ni^{2+}$ | about 0.18 to about 0.4 moles/liter |
| Organic additives | about 0.4-1 grams/liter |
| sodium lauryl sulfate or sodium dodecyl sulfate | about 0.1 grams/liter |
| $Fe^{2+}$ | about 0.031 to about 0.05 moles/liter |
| X elements (e.g., Re, Ir, Os) | about 0.2-0.4 millimolar |
| $Fe^{3+}$ | between about 0.001 gram/liter to about 0.01 gram/liter |
| pH | about 2 to about 3 |

As can be seen in Table 5 above, when $Fe^{2+}$ is between about 0.031 to about 0.05 moles/liter, a mixed fcc and bcc layer of NiFeX may be formed. It should be noted that, when $Fe^{2+}$ is between about 0.01 to about 0.03 moles/liter, a layer of NiFeX with a predominantly fcc crystalline structure may be formed, and, when $Fe^{2+}$ is between about 0.01 to about 0.03 moles/liter, the NiFeX layer formed may have a predominantly bcc crystalline structure.

As noted above, sources of $Ni^{2+}$ and $Fe^{2+}$ may include chlorides, sulfates and perchlorates, and X elements may be any salt including that element and that is dissolvable in an aqueous solution. Table 6 below includes examples of deposition conditions.

TABLE 6

| CONDITION | RANGE/VALUE |
| --- | --- |
| t_on | 10-400 milliseconds |
| t_off | 20-1000 milliseconds |
| I | about 25 milliamperes/square centimeter to about 100 milliamperes/square centimeter |
| rate of formation of the ultra-high damping magnetic alloy layer | about 40-100 nanometers/minute |

An electrolyte provided as show in Table 5 and the conditions shown in Table 6 may be used in the apparatus of FIG. 4 to form $(Ni_{30-39}Fe_{61-70})_{94-96.5}X_{3.5-6}$ with the following properties:

Stress between about 150 to about 250 mega pascals (MPa).

Saturation magnetization (Bs) between about 0.8 to about 1.4 Tesla.

Easy axis coercivity (Hce) between about 4 to about 15 Oersted.

Hard axis coercivity (Hch) between about 0.5 to about 6 Oersted.

Damping constant: about 0.04 to about 0.07.

Uniformity between about 6 to about 8%, where uniformity=range (e.g., maximum−minimum)/mean.

As will be described below, the deposition conditions may vary depending on a type of layer (e.g., a sheet film or a patterned film) to be formed.

Figure 18B:
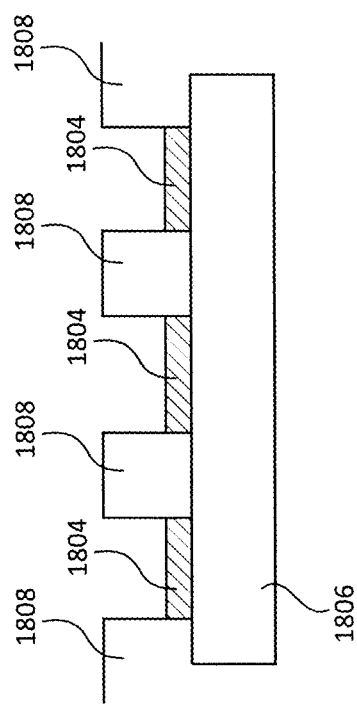
FIG. 18B is a diagrammatic illustration of a mixed fcc and bcc NiFeX patterned film formed on a wafer by an electrodeposition process of the type described above in connection with FIG. 4.
Figure 18A:
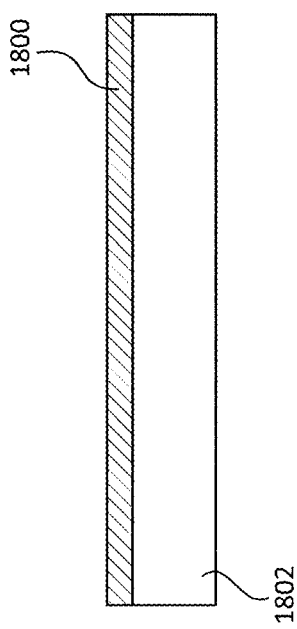
FIG. 18A is a diagrammatic illustration of a mixed fcc and bcc NiFeX sheet film formed on a wafer by an electrodeposition process of the type described above in connection with FIG. 4.

FIG. 18A is a diagrammatic illustration of a mixed fcc and bcc NiFeX sheet film 1800 formed on a wafer 1802 by an electrodeposition process of the type described above in connection with FIG. 4. To form film 1800, wafer 1802 is attached to arm 413 (of FIG. 4), immersed in solution 414 (of FIG. 4) having compounds of Table 5, and supplied with a pulsed current in a manner described above in connection with FIG. 4 with deposition conditions of Table 6. A current density of 25-65 mA/cm² is suitable for sheet film 1802 formation.

FIG. 18B is a diagrammatic illustration of a mixed fcc and bcc NiFeX patterned film 1804 formed on a wafer 1806 by an electrodeposition process of the type described above in connection with FIG. 4. Here, a photoresist pattern 1808 may be formed on wafer 1808 prior to the electrodeposition process. In general, patterned film 1804 is formed in a manner similar to sheet film 1800 (of FIG. 18A). However, for patterned film 1804 formation, a current density of 60-100 mA/cm² may be utilized.

Figure 19C:
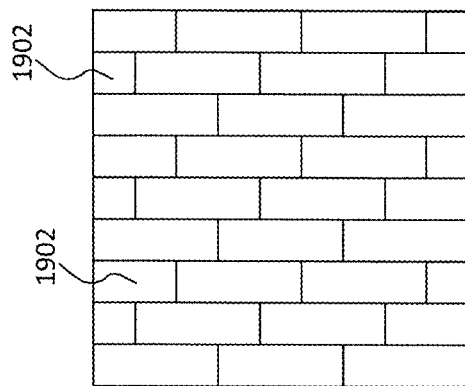
FIGS. 19A, 19B and 19C are simplified diagrammatic illustrations that show different crystal structures of NiFeX.
Figure 19B:
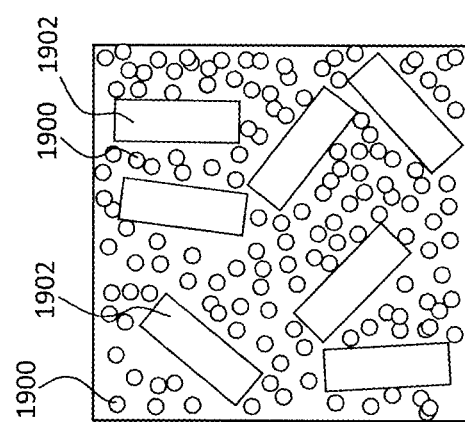
Figure 19A:
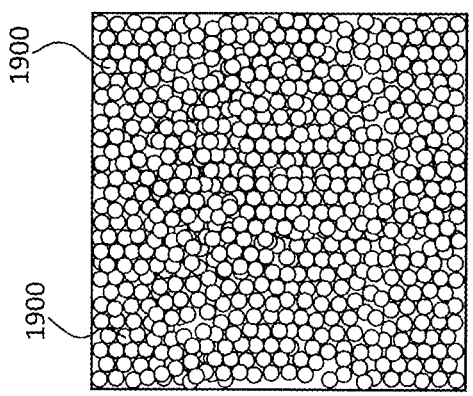

FIGS. 19A, 19B and 19C are simplified diagrammatic illustrations that show different crystal structures of NiFeX. FIG. 19A shows NiFeX with an fcc crystalline structure including fcc grains 1900 that may be, for example, about 10 nm in size. FIG. 19B illustrates NiFeX with a mixed fcc and bcc crystalline structure in which fcc grains 1900 (having a size of 10 nm, for example) coexist with bcc grains 1902 (having sizes between 20-50 nm, for example). FIG. 19C shows has a predominantly bcc crystalline structure in which bcc grains 1902 (having sizes between 20-50 nm, for example) are in a columnar arrangement. FIGS. 19D, 19E and 19F are images of NiFeX layers generated from transmission electron microscopy (TEM). FIG. 19D corresponds to FIG. 19A and shows NiFeX with a predominantly fcc crystalline structure. Similarly, FIG. 19E corresponds to FIG. 19B and shows NiFeX with a mixed fcc and bcc crystalline structure, and FIG. 19F corresponds to FIG. 19C and shows NiFeX with a predominantly bcc crystalline structure. FIGS. 19G, 19H and 19I show selected area electron diffraction (SAED) images of layers of predominantly fcc NiFeX, mixed fcc and bcc NiFeX and predominantly bcc NiFeX, respectively. In FIG. 19H, regions 1904 are double rings in mixed fcc and bcc NiFeX.

The interfacial energy in mixed fcc-bcc NiFeX is attributed to the structural difference across the fcc-bcc boundary, and the strain energy is proportional to the volume of the bcc crystals. As indicated above, bcc metal undergoes a slip deformation to relax strain, and the formation of coarse grains is accompanied by an extensive tangling of dislocations on the slip plane. In ultrahigh damping NiFeRe, the 20-50 nm bcc grains (with slip deformation for strain relaxation inside) and the 10 nm fcc grains coexist, and thus stress/strain is caused, which significantly enhances the damping extrinsically.

Figure 20:
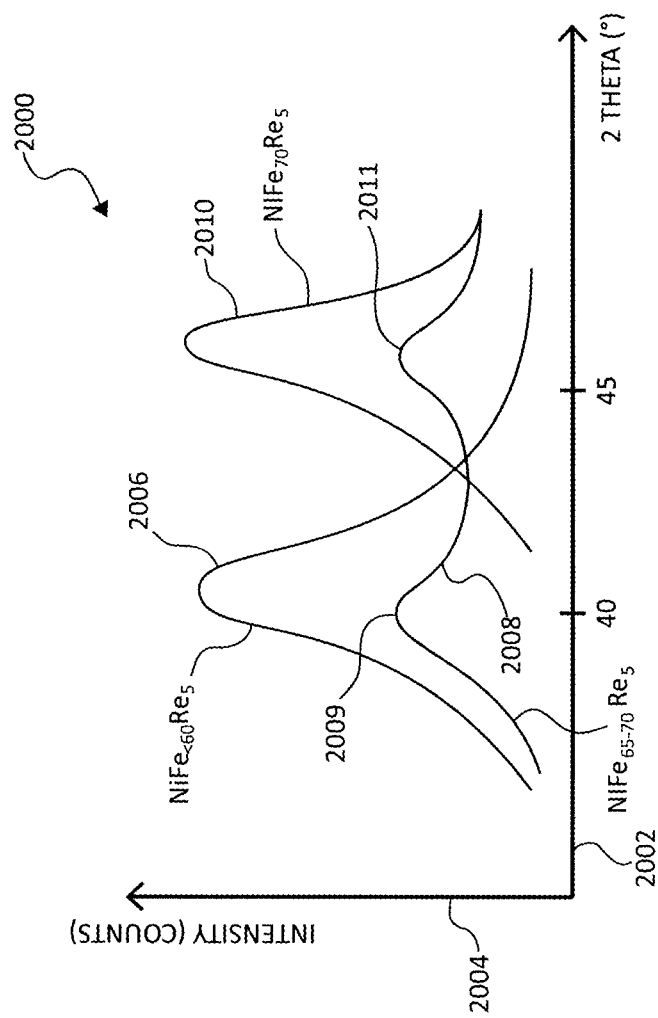
FIG. 20 is a graph that shows plots of results of X-ray diffraction (XRD) analysis of NiFeRe with different damping.

FIG. 20 is a graph 2000 that shows plots of results of X-ray diffraction (XRD) analysis of NiFeRe with different damping. In FIG. 20, horizontal axis 2002 represents 2Theta in degrees)(°) and vertical axis 2004 represents intensity in counts. Plot 2006, 2008 and 2010 represent represents XRD results for, $NiFe_{n<60}X_m$, $NiFe_{n=61-7}X_m$, and $NiFe_{n>70}X_m$=respectively. Plot 2008 shows a substantially same intensity level for both fcc and bcc, thereby showing a substantially equal fcc and bcc mix. It should be noted that, if a bias in the fcc-bcc mix is towards fcc, then an area under portion 2009 of plot 2008 will be greater than an area under portion 2011 of plot 2008. In contrast, if the bias in the fcc-bcc mix is towards bcc, then an area under portion 2009 of plot 2008 will be less than an area under portion 2011 of plot 2008. Generally, mixed fcc and bcc NiFeRe tends to be small grained, since the discontinuity of crystal structure along the phase boundaries prevents the coarsening of both phases. However, for ultrahigh damping, extremely small grains (e.g., less than 9 nm) may not be suitable, and therefore deposition conditions may be tuned to generate medium grain size (e.g., 10-30 nm), especially for bcc. The tuning of the deposition conditions may involve using less organic additives (e.g., about 0.4-1 grams/liter) and medium pulse timing (e.g., t_on 50-150 milliseconds and t_off 400-600 milliseconds).

Table 7 below is a comparison of damping values obtained for NiFeX with different compositions of Fe.

TABLE 7

| Wt % of Fe in NiFe contained in $(Ni_{100-n}Fe_n)_{100-m}X_m$ | at % of X in NiFeX | Damping | Crystal structure |
| --- | --- | --- | --- |
| 15-60 | 2-5 | 0.015-0.02 | fcc |
| 61-70 | 3.5-6 | 0.04-0.07 | fcc + bcc |
| 71-90 | 4< | 0.02-0.039 | bcc |

Table 7 above shows that a NiFeX film having 61-70 wt % of Fe and 3.5-6 at % of X in $(Ni_{100-n}Fe_n)_{100-m}X_m$, has a highest damping value of 0.7. As indicated above, NiFeX with a high or ultra-high damping value may be suitable for use with a main pole layer of a recording head and/or in a side shield of the recording head. Experimental conditions are corresponding results, which are provided below in connection with Tables 8A1 through 10B6, substantially confirm the different damping values and the crystal structures for the different compositions of Fe and X provided in Table 7.

Tables 8A1 through 8B2 included below show electrolytes and deposition conditions employed in experiments in which patterned films of NiFeRe are deposited. Tables 8A1 and 8B1 include first electrolyte and first deposition conditions for formation of a first type of patterned film of NiFeRe, and Tables 8A2 and 8B2 include second electrolyte and second deposition conditions for formation of the same first type of patterned film of NiFeRe. As will be seen below in Table 8A1, 0.028 moles/liter of $Fe^{2+}$ is employed in the first electrolyte. In contrast, Table 8A2 employs 0.040 moles/liter of $Fe^{2+}$. Concentrations of other compounds used in the first electrolyte (Table 8A1) and the second electrolyte (Table 8A2) are the same. As will be seen in Table 8B1, current density (I) utilized is 50 milliamperes/square centimeter. In Table 8B2, the current density employed is 55 milliamperes/square centimeter. Other values in Tables 8B1 and 8B2 are the same.

TABLE 8A1

| COMPOUND | VALUE |
|---|---|
| $H_3BO_3$ | 0.405 moles/liter |
| $Ni^{2+}$ | 0.379 moles/liter |
| Organic additives | 0.8 grams/liter |
| sodium lauryl sulfate or sodium dodecyl sulfate | 0.1 grams/liter |
| $Fe^{2+}$ | 0.028 moles/liter |
| Re | 0.19 millimolar |
| $Fe^{3+}$ | 0.001 |
| pH | 2.9 |

TABLE 8B1

| CONDITION | RANGE/VALUE |
|---|---|
| t_on | 40 milliseconds |
| t_off | 360 milliseconds |
| I | 50 milliamperes/square centimeter |
| rate of formation of the high damping magnetic alloy layer | 72 nanometers/minute |

TABLE 8A2

| COMPOUND | VALUE |
|---|---|
| $H_3BO_3$ | 0.405 moles/liter |
| $Ni^{2+}$ | 0.379 moles/liter |
| Organic additives | 0.8 grams/liter |
| sodium lauryl sulfate or sodium dodecyl sulfate | 0.1 grams/liter |
| $Fe^{2+}$ | 0.040 moles/liter |
| Re | 0.19 millimolar |
| $Fe^{3+}$ | 0.001 |
| pH | 2.9 |

TABLE 8B2

| CONDITION | RANGE/VALUE |
|---|---|
| t_on | 40 milliseconds |
| t_off | 360 milliseconds |
| I | 55 milliamperes/square centimeter |
| rate of formation of the high damping magnetic alloy layer | 90 nanometers/minute |

It was found that the first electrolyte of Table 8A1 and the first conditions in Table 8A2 produced NiFeRe having an fcc crystal structure, and the second electrolyte of Table 8A2 and the second conditions in Table 8B2 produced NiFeRe with a mixed fcc and bcc structure. Also, a comparison of Tables 8B1 and 8B2 shows that the rate of formation of the high damping magnetic alloy layer increases with an increase in current density (I). It should be noted that results obtained (e.g., fcc or mixed fcc and bcc) using the same electrolyte and conditions for different types/sizes of patterns may be different because the types/sizes of patterns have an impact on the result.

Tables 9A1 through 9B4 included below show electrolytes and deposition conditions employed in a first set of experiments in which sheet films of NiFeRe are deposited. Tables 9A1 and 9B1 include first electrolyte and first deposition conditions for formation of a sheet film of NiFeRe, and Tables 8A2 and 8B2, 8A3 and 8B3, and 8A4 and 8B4 include respective second, third and fourth electrolytes and deposition conditions for formation of sheet films of NiFeRe.

TABLE 9A1

| COMPOUND | VALUE |
|---|---|
| $H_3BO_3$ | 0.405 moles/liter |
| $Ni^{2+}$ | 0.379 moles/liter |
| Organic additives | 0.8 grams/liter |
| sodium lauryl sulfate or sodium dodecyl sulfate | 0.1 grams/liter |
| $Fe^{2+}$ | 0.028 moles/liter |
| Re | 0.19 millimolar |
| $Fe^{3+}$ | 0.001 |
| pH | 2.9 |

TABLE 9B1

| CONDITION | RANGE/VALUE |
|---|---|
| t_on | 40 milliseconds |
| t_off | 360 milliseconds |
| I | 35 milliamperes/square centimeter |
| rate of formation of the high damping magnetic alloy layer | 59 nanometers/minute |

It was found that the electrolyte of Table 9A1 and the conditions in Table 9B1 produced an NiFeRe layer having an fcc crystal structure with Ni having a wt % of 42, Fe having a wt % of 58 and Re having an at % of 5, with the NiFeRe layer having a damping constant of 0.0165.

TABLE 9A2

| COMPOUND | VALUE |
|---|---|
| $H_3BO_3$ | 0.405 moles/liter |
| $Ni^{2+}$ | 0.210 moles/liter |
| Organic additives | 0.8 grams/liter |
| sodium lauryl sulfate or sodium dodecyl sulfate | 0.1 grams/liter |
| $Fe^{2+}$ | 0.031 moles/liter |
| Re | 0.37 millimolar |
| $Fe^{3+}$ | 0.001 |
| pH | 2.9 |

TABLE 9B2

| CONDITION | RANGE/VALUE |
|---|---|
| t_on | 40 milliseconds |
| t_off | 360 milliseconds |
| I | 30 milliamperes/square centimeter |

TABLE 9B2-continued

| CONDITION | RANGE/VALUE |
|---|---|
| rate of formation of the high damping magnetic alloy layer | 51 nanometers/minute |

It was found that the electrolyte of Table 9A2 and the conditions in Table 9B2 produced an NiFeRe layer having a mixed fcc and bcc crystal structure with Ni having a wt % of 33, Fe having a wt % of 67 and Re having an at % of 6.2, with the NiFeRe layer having a damping constant of 0.035.

TABLE 9A3

| COMPOUND | VALUE |
|---|---|
| $H_3BO_3$ | 0.405 moles/liter |
| $Ni^{2+}$ | 0.210 moles/liter |
| Organic additives | 0.8 grams/liter |
| sodium lauryl sulfate or sodium dodecyl sulfate | 0.1 grams/liter |
| $Fe^{2+}$ | 0.031 moles/liter |
| Re | 0.37 millimolar |
| $Fe^{3+}$ | 0.001 |
| pH | 2.9 |

TABLE 9B3

| CONDITION | RANGE/VALUE |
|---|---|
| t_on | 40 milliseconds |
| t_off | 360 milliseconds |
| I | 35 milliamperes/square centimeter |
| rate of formation of the high damping magnetic alloy layer | 59 nanometers/minute |

It was found that the electrolyte of Table 9A3 and the conditions in Table 9B3 produced an NiFeRe layer having a mixed fcc and bcc crystal structure with Ni having a wt % of 33.5, Fe having a wt % of 66.5 and Re having an at % of 5.1, with the NiFeRe layer having a damping constant of 0.061.

TABLE 9A4

| COMPOUND | VALUE |
|---|---|
| $H_3BO_3$ | 0.405 moles/liter |
| $Ni^{2+}$ | 0.210 moles/liter |
| Organic additives | 0.8 grams/liter |
| sodium lauryl sulfate or sodium dodecyl sulfate | 0.1 grams/liter |
| $Fe^{2+}$ | 0.031 moles/liter |
| Re | 0.37 millimolar |
| $Fe^{3+}$ | 0.001 |
| pH | 2.9 |

TABLE 9B4

| CONDITION | RANGE/VALUE |
|---|---|
| t_on | 40 milliseconds |
| t_off | 360 milliseconds |
| I | 40 milliamperes/square centimeter |
| rate of formation of the high damping magnetic alloy layer | 69 nanometers/minute |

It was found that the electrolyte of Table 9A4 and the conditions in Table 9B4 produced an NiFeRe layer having a mixed fcc and bcc crystal structure with Ni having a wt % of 34, Fe having a wt % of 66 and Re having an at % of 4, with the NiFeRe layer having a damping constant of 0.048.

Tables 10A1 through 10B4 included below show electrolytes and deposition conditions employed in a second set of experiments in which sheet films of NiFeRe are deposited.

TABLE 10A1

| COMPOUND | VALUE |
|---|---|
| $H_3BO_3$ | 0.405 moles/liter |
| $Ni^{2+}$ | 0.379 moles/liter |
| Organic additives | 0.8 grams/liter |
| sodium lauryl sulfate or sodium dodecyl sulfate | 0.1 grams/liter |
| $Fe^{2+}$ | 0.024 moles/liter |
| Re | 0.19 millimolar |
| $Fe^{3+}$ | 0.001 |
| pH | 2.9 |

TABLE 10B1

| CONDITION | RANGE/VALUE |
|---|---|
| t_on | 40 milliseconds |
| t_off | 360 milliseconds |
| I | 28 milliamperes/square centimeter |
| rate of formation of the high damping magnetic alloy layer | 44 nanometers/minute |

It was found that the electrolyte of Table 10A1 and the conditions in Table 10B1 produced an NiFeRe layer having an fcc crystal structure with Ni having a wt % of 43, Fe having a wt % of 57 and Re having an at % of 7, with the NiFeRe layer having a damping constant of 0.0198.

TABLE 10A2

| COMPOUND | VALUE |
|---|---|
| $H_3BO_3$ | 0.405 moles/liter |
| $Ni^{2+}$ | 0.379 moles/liter |
| Organic additives | 0.8 grams/liter |
| sodium lauryl sulfate or sodium dodecyl sulfate | 0.1 grams/liter |
| $Fe^{2+}$ | 0.024 moles/liter |
| Re | 0.19 millimolar |
| $F^{e3+}$ | 0.001 |
| pH | 2.9 |

TABLE 10B2

| CONDITION | RANGE/VALUE |
|---|---|
| t_on | 40 milliseconds |
| t_off | 360 milliseconds |
| I | 38 milliamperes/square centimeter |
| rate of formation of the high damping magnetic alloy layer | 65 nanometers/minute |

It was found that the electrolyte of Table 10A2 and the conditions in Table 10B2 produced an NiFeRe layer having an fcc crystal structure with Ni having a wt % of 42.5, Fe having a wt % of 57.5 and Re having an at % of 4.7, with the NiFeRe layer having a damping constant of 0.015.

TABLE 10A3

| COMPOUND | VALUE |
| --- | --- |
| $H_3BO_3$ | 0.405 moles/liter |
| $Ni^{2+}$ | 0.379 moles/liter |
| Organic additives | 0.8 grams/liter |
| sodium lauryl sulfate or sodium dodecyl sulfate | 0.1 grams/liter |
| $Fe^{2+}$ | 0.024 moles/liter |
| Re | 0.19 millimolar |
| $Fe^{3+}$ | 0.001 |
| pH | 2.9 |

TABLE 10B3

| CONDITION | RANGE/VALUE |
| --- | --- |
| t_on | 40 milliseconds |
| t_off | 360 milliseconds |
| I | 55 milliamperes/square centimeter |
| rate of formation of the high damping magnetic alloy layer | 100 nanometers/minute |

It was found that the electrolyte of Table 10A3 and the conditions in Table 10B3 produced an NiFeRe layer having an fcc crystal structure with Ni having a wt % of 42, Fe having a wt % of 58 and Re having an at % of 3, with the NiFeRe layer having a damping constant of 0.0145.

TABLE 10A4

| COMPOUND | VALUE |
| --- | --- |
| $H_3BO_3$ | 0.405 moles/liter |
| $Ni^{2+}$ | 0.210 moles/liter |
| Organic additives | 0.8 grams/liter |
| sodium lauryl sulfate or sodium dodecyl sulfate | 0.1 grams/liter |
| $Fe^{2+}$ | 0.025 moles/liter |
| Re | 0.37 millimolar |
| $Fe^{3+}$ | 0.001 |
| pH | 2.9 |

TABLE 10B4

| CONDITION | RANGE/VALUE |
| --- | --- |
| t_on | 40 milliseconds |
| t_off | 360 milliseconds |
| I | 35 milliamperes/square centimeter |
| rate of formation of the high damping magnetic alloy layer | 61 nanometers/minute |

It was found that the electrolyte of Table 10A4 and the conditions in Table 10B4 produced an NiFeRe layer having a substantially fcc crystal structure with Ni having a wt % of 38, Fe having a wt % of 62 and Re having an at % of 5.2, with the NiFeRe layer having a damping constant of 0.029. It should be noted that due the high Ni content and the relatively low Fe content, this experiment provides a "borderline" result, which is between a purely fcc crystal structure and a highly mixed fcc and bcc crystal structure. It should be noted that retaining the same weight percentages of Ni and Fe (e.g., Ni having a wt % of 38 and Fe having a wt % of 62), increasing the atomic percent of NiFe, and lowering the atomic percent of Re (e.g., less than at % of 5.2) will reduce the fcc percentage and increase the bcc percentage. Thus, achieving a mixed fcc and bcc crystalline structure depends on the Fe content level, the Ni content level, the Re content level, experimental conditions, etc.

TABLE 10A5

| COMPOUND | VALUE |
| --- | --- |
| $H_3BO_3$ | 0.405 moles/liter |
| $Ni^{2+}$ | 0.210 moles/liter |
| Organic additives | 0.8 grams/liter |
| sodium lauryl sulfate or sodium dodecyl sulfate | 0.1 grams/liter |
| $Fe^{2+}$ | 0.033 moles/liter |
| Re | 0.37 millimolar |
| $Fe^{3+}$ | 0.001 |
| pH | 2.9 |

TABLE 10B5

| CONDITION | RANGE/VALUE |
| --- | --- |
| t_on | 40 milliseconds |
| t_off | 360 milliseconds |
| I | 35 milliamperes/square centimeter |
| rate of formation of the high damping magnetic alloy layer | 60 nanometers/minute |

It was found that the electrolyte of Table 10A5 and the conditions in Table 10B5 produced an NiFeRe layer having a mixed fcc and bcc crystal structure with Ni having a wt % of 33, Fe having a wt % of 67 and Re having an at % of 5.3, with the NiFeRe layer having a damping constant of 0.06.

TABLE 10A6

| COMPOUND | VALUE |
| --- | --- |
| $H_3BO_3$ | 0.405 moles/liter |
| $Ni^{2+}$ | 0.210 moles/liter |
| Organic additives | 0.8 grams/liter |
| sodium lauryl sulfate or sodium dodecyl sulfate | 0.1 grams/liter |
| $Fe^{2+}$ | 0.040 moles/liter |
| Re | 0.37 millimolar |
| $Fe^{3+}$ | 0.001 |
| pH | 2.9 |

TABLE 10B6

| CONDITION | RANGE/VALUE |
| --- | --- |
| t_on | 40 milliseconds |
| t_off | 360 milliseconds |
| I | 40 milliamperes/square centimeter |
| rate of formation of the high damping magnetic alloy layer | 74 nanometers/minute |

It was found that the electrolyte of Table 10A6 and the conditions in Table 10B6 produced an NiFeRe layer having a bcc crystal structure with Ni having a wt % of 28, Fe having a wt % of 72 and Re having an at % of 4.9, with the NiFeRe layer having a damping constant of 0.028. The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A data storage device comprising:
   a recording head having a high damping magnetic alloy layer comprising:
      at least one magnetic alloy element; and
      a 5d transition element;
      the high damping magnetic alloy layer having a mixed face-centered cubic (fcc) and body-centered cubic (bcc) crystal structure; and
      the mixed fcc and bcc crystal structure comprising fcc and bcc grains, with the bcc grains having an elongated shape relative to the fcc grains, a larger size than the fcc grains, and slip deformation, thereby providing the high damping magnetic alloy layer with a damping constant of up to about 0.07.

2. The data storage device of claim 1 and wherein the at least one magnetic alloy element comprises a first magnetic alloy element and a second magnetic alloy element.

3. The data storage device of claim 2 and wherein:
   the first magnetic alloy element comprises Ni;
   the second magnetic alloy element comprises Fe; and
   the 5d transition element comprises Re, Ir, Os, Pt, W or Ta.

4. The data storage device of claim 3 and wherein a weight percent of Fe in the high damping magnetic alloy layer is between 60 and 70 and an atomic percent of the 5d transition element is between 3.5 and 6 percent.

5. The data storage device of claim 1 and wherein grains of the high damping magnetic alloy layer have a size between 10 nanometers and 30 nanometers.

6. A recording head comprising:
   a high damping magnetic alloy layer comprising:
      at least one magnetic alloy element; and
      a 5d transition element;
      the high damping magnetic alloy layer having a mixed face-centered cubic (fcc) and body-centered cubic (bcc) crystal structure; and
      the mixed fcc and bcc crystal structure comprising fcc and bcc grains, with the bcc grains having an elongated shape relative to the fcc grains, a larger size than the fcc grains, and slip deformation, thereby providing the high damping magnetic alloy layer with a damping constant of up to about 0.07.

7. The recording head of claim 6 and wherein the at least one magnetic alloy element comprises a first magnetic alloy element and a second magnetic alloy element.

8. The recording head of claim 7 and wherein:
   the first magnetic alloy element comprises Ni;
   the second magnetic alloy element comprises Fe; and
   the 5d transition element comprises Re, Ir, Os, Pt, W or Ta.

9. The recording head of claim 8 and wherein a weight percent of Fe in the high damping magnetic alloy layer is between 60 and 70 and an atomic percent of the transition element is between 3.5 and 6 percent.

10. The recording head of claim 6 and wherein grains of the high damping magnetic alloy layer have a size between 10 nanometers and 30 nanometers.

11. The recording head of claim 6 and further comprising a main pole comprising the high damping magnetic alloy layer.

12. The recording head of claim 6 and further comprising at least one shield comprising the high damping magnetic alloy layer.

13. A recording head comprising:
   a high damping magnetic alloy layer comprising Ni, Fe and a 5d transition element, the high damping alloy layer having a mixed face-centered cubic (fcc) and body-centered cubic (bcc) crystal structure comprising fcc and bcc grains, with the bcc grains having an elongated shape relative to the fcc grains, a larger size than the fcc grains, and slip deformation, thereby providing the high damping magnetic alloy layer with a damping constant of up to about 0.07.

14. The recording head of claim 13 and wherein a weight percent of Fe in the high damping magnetic alloy layer is between 60 and 70 and an atomic percent of the 5d transition element is between 3.5 and 6 percent.

15. The recording head of claim 13 and wherein grains of the high damping magnetic alloy layer have a size between 10 nanometers and 30 nanometers.

* * * * *

UNITED STATES PATENT AND TRADEMARK OFFICE
CERTIFICATE OF CORRECTION

PATENT NO. : 11,913,130 B1
APPLICATION NO. : 17/830695
DATED : February 27, 2024
INVENTOR(S) : Jie Gong et al.

Page 1 of 1

It is certified that error appears in the above-identified patent and that said Letters Patent is hereby corrected as shown below:

In the Claims

Column 22, Claim 9, Line 36, please insert the word --5d-- between the words "the" and "transition".

Signed and Sealed this
Second Day of April, 2024

Katherine Kelly Vidal
*Director of the United States Patent and Trademark Office*